(12) United States Patent
Alam et al.

(10) Patent No.: US 6,324,544 B1
(45) Date of Patent: Nov. 27, 2001

(54) FILE OBJECT SYNCHRONIZATION BETWEEN A DESKTOP COMPUTER AND A MOBILE DEVICE

(75) Inventors: Salim Alam; Vinayak A. Bhalerao, both of Redmond; Charles Wu, Bellevue; George Hu, Redmond; John I. Ferrell, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/176,706

(22) Filed: Oct. 21, 1998

(51) Int. Cl.[7] ........................................ G06F 17/30
(52) U.S. Cl. ........................ 707/201; 707/8; 707/202
(58) Field of Search .................... 707/201, 8, 10, 707/202

(56) References Cited

U.S. PATENT DOCUMENTS

| | | | |
|---|---|---|---|
| 5,392,390 | | 2/1995 | Crozier ................................ 395/161 |
| 5,630,081 | | 5/1997 | Rybicki et al. ...................... 395/348 |
| 5,664,176 | * | 9/1997 | Madduri ................................. 707/8 |
| 5,664,228 | | 9/1997 | Mital .................................... 395/882 |
| 5,666,530 | * | 9/1997 | Clark et al. ......................... 707/201 |
| 5,684,990 | | 11/1997 | Boothby .............................. 395/619 |
| 5,701,423 | | 12/1997 | Crozier ................................ 395/335 |
| 5,710,917 | * | 1/1998 | Musa et al. ........................... 707/10 |
| 5,799,323 | * | 8/1998 | Mosher, Jr. et al. ................ 707/202 |
| 5,832,510 | * | 11/1998 | Ito et al. ............................. 707/201 |
| 5,926,816 | * | 7/1999 | Bauer et al. ............................ 707/8 |
| 5,928,329 | * | 7/1999 | Clark et al. .......................... 709/227 |
| 6,000,000 | * | 12/1999 | Hawkins et al. .................... 707/201 |
| 6,026,401 | * | 2/2000 | Brealey et al. .......................... 707/8 |
| 6,052,735 | * | 4/2000 | Ulrich et al. ........................ 709/236 |

FOREIGN PATENT DOCUMENTS

| | | |
|---|---|---|
| WO 94/15294 | 7/1994 | (WO) . |
| WO 97/23853 | 7/1997 | (WO) . |

OTHER PUBLICATIONS

"In Defense of the Personal Digital Assistant", by Jon Hulak, *Business Communications Review*, Oct. 1995, pp. 45–48.

"Managing contacts in Windows 95", by Kevin O'Connor and Maheem Zaman, *PC User*, Apr. 1996, p. 79.

"The CallManager system: A plaftorm for intelligent telecommunications services", by David J. Pepper, Sharad Singhal and Scott Soper, *Speech Communications*, 23 (1997) pp. 129–139.

"Method for Personal Digital Assistance Calendar Expert Nomenclature", IBM Technical Disclosure Bulletin, vol. 37, No. 03, Mar. 1994, p. 481.

\* cited by examiner

*Primary Examiner*—Paul R. Lintz
(74) *Attorney, Agent, or Firm*—Joseph R. Kelly; Westman, Champlin & Kelly, P.A.

(57) ABSTRACT

First and second computing devices each contain an object store which store objects indicative of file data. Synchronization components are provided to synchronize the objects while efficiently overcoming problems associated with synchronizing files.

24 Claims, 16 Drawing Sheets

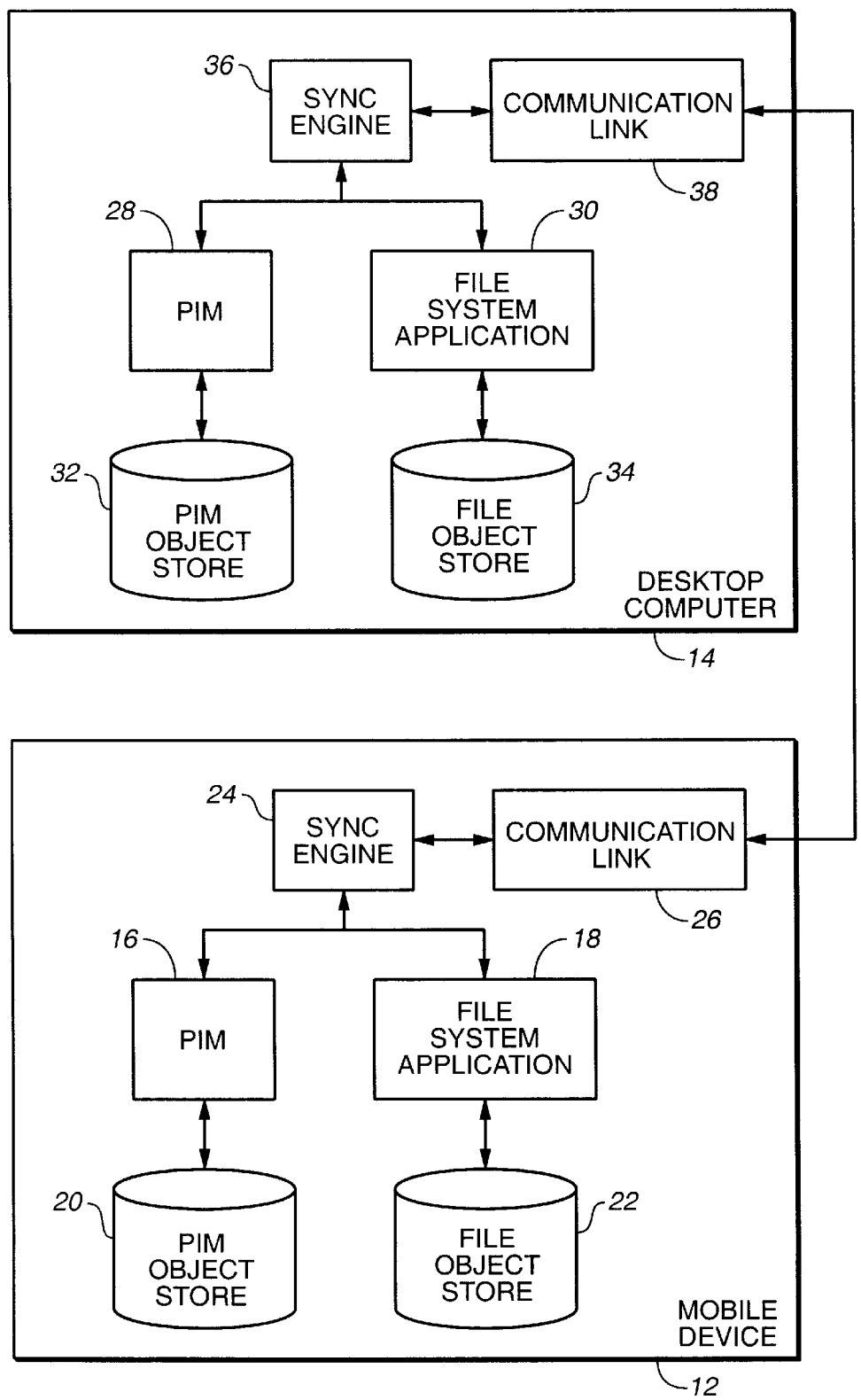
FIG._1

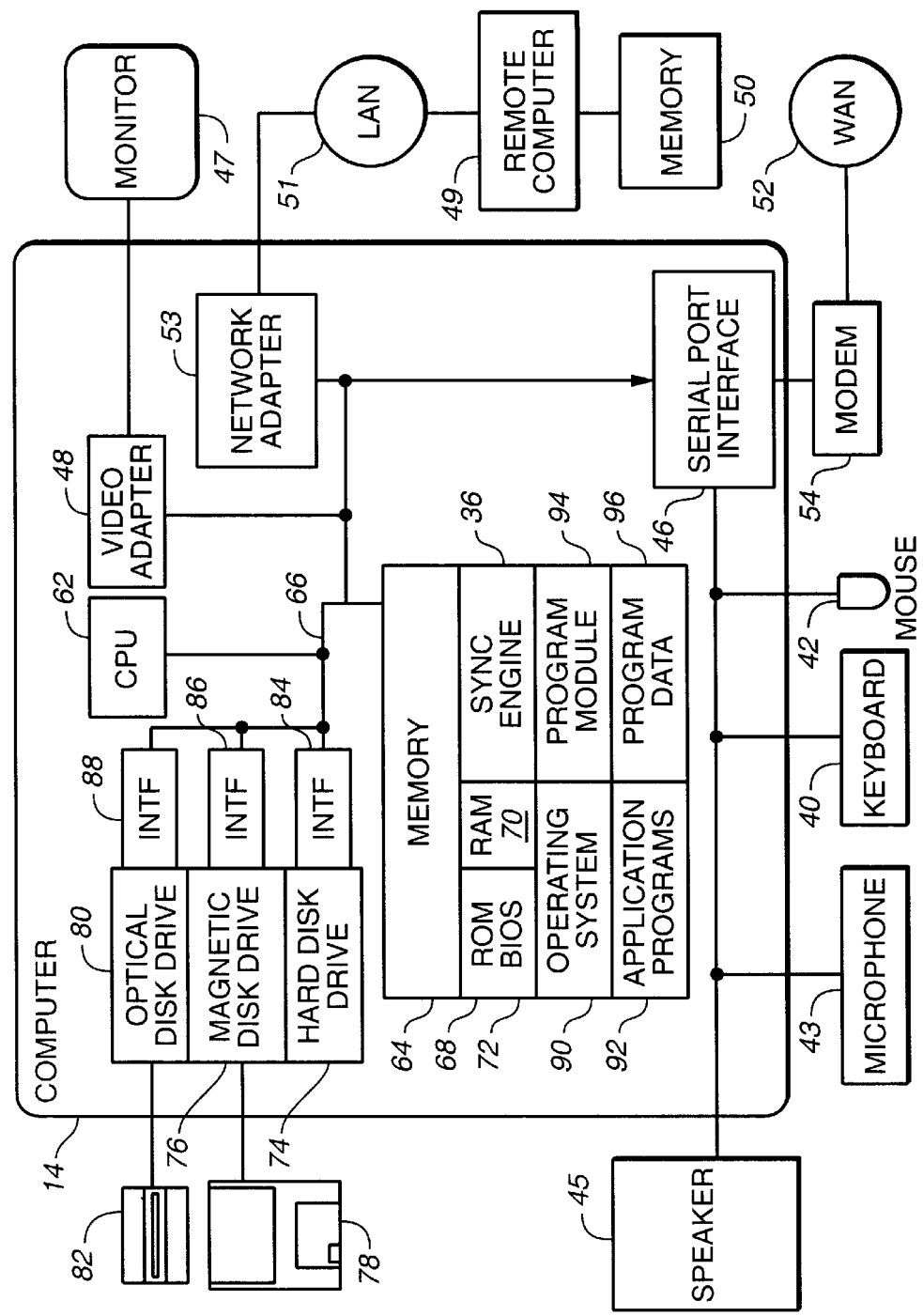
FIG._2

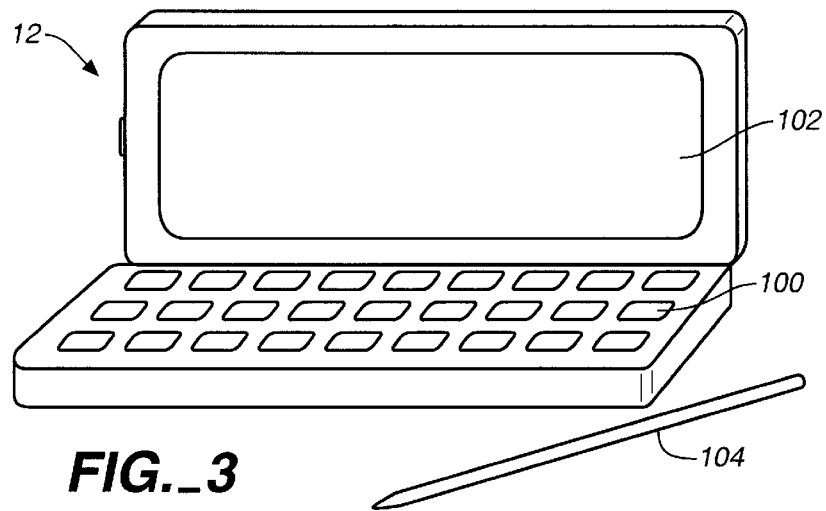
FIG._3
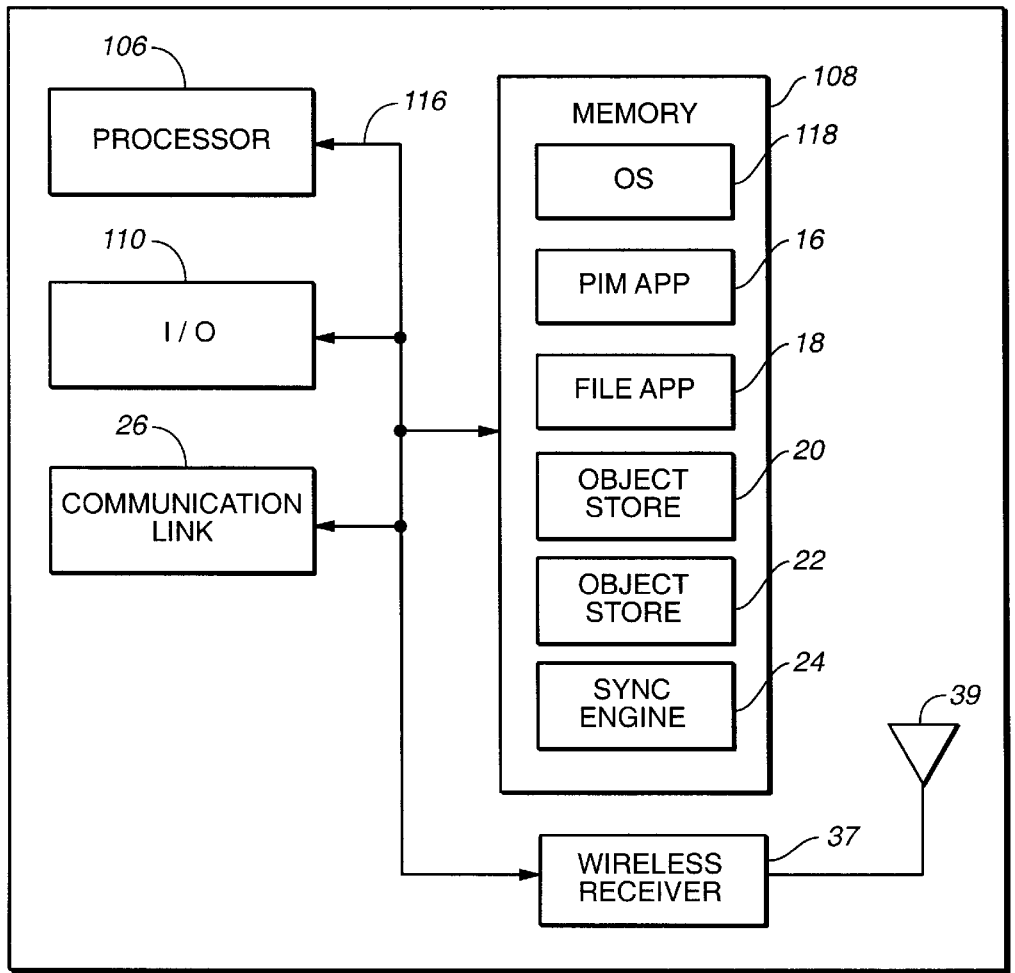
FIG._4

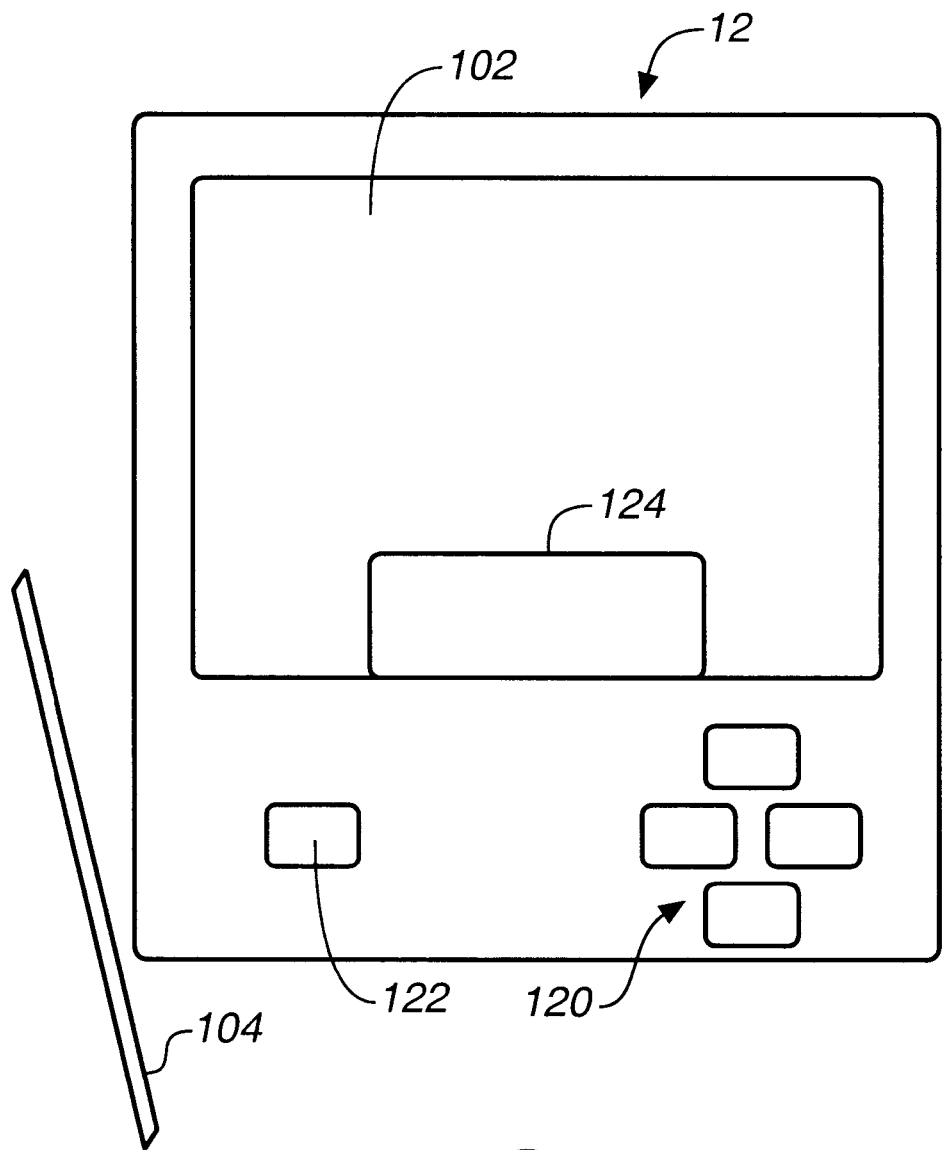
FIG._5

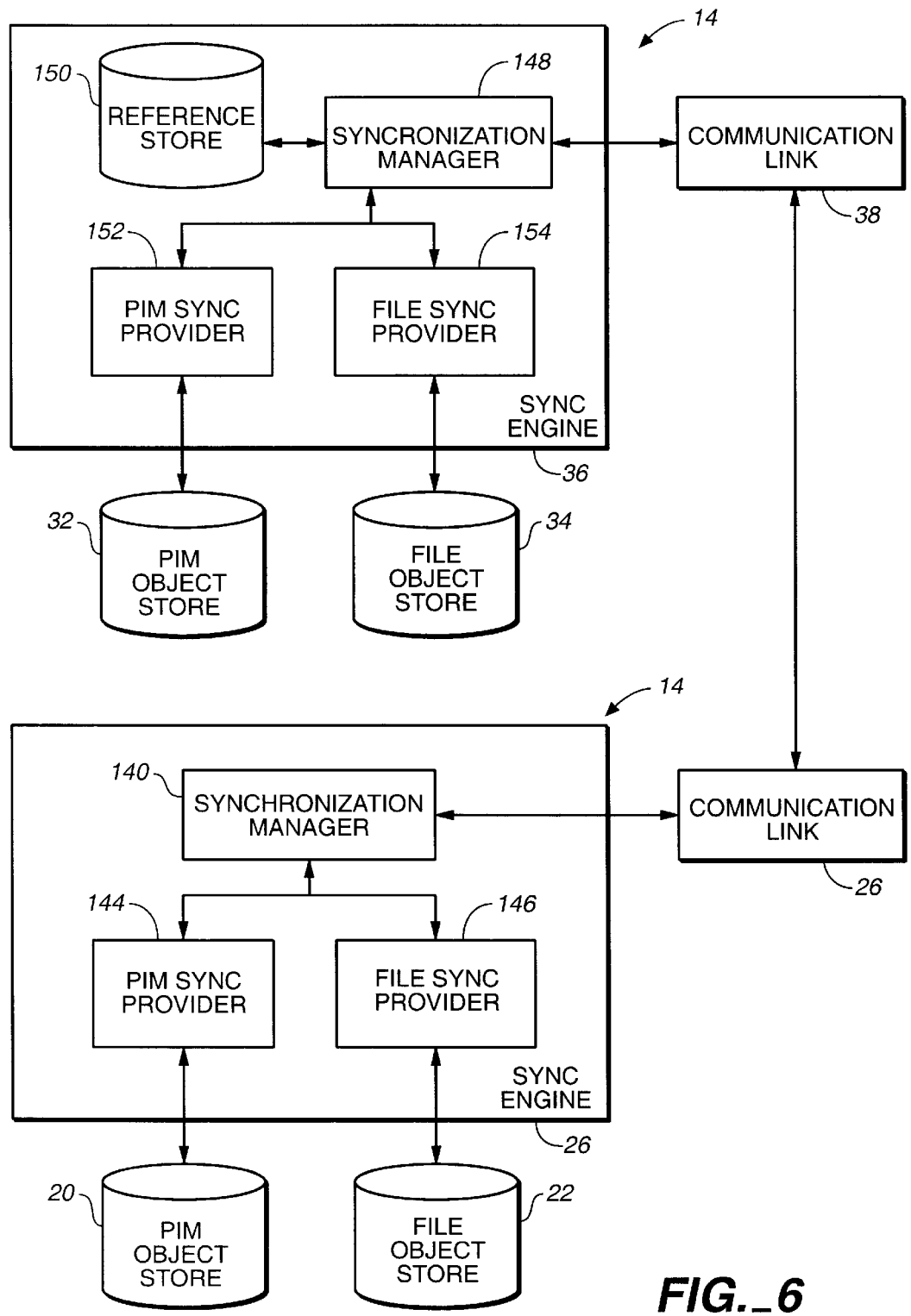
FIG._6

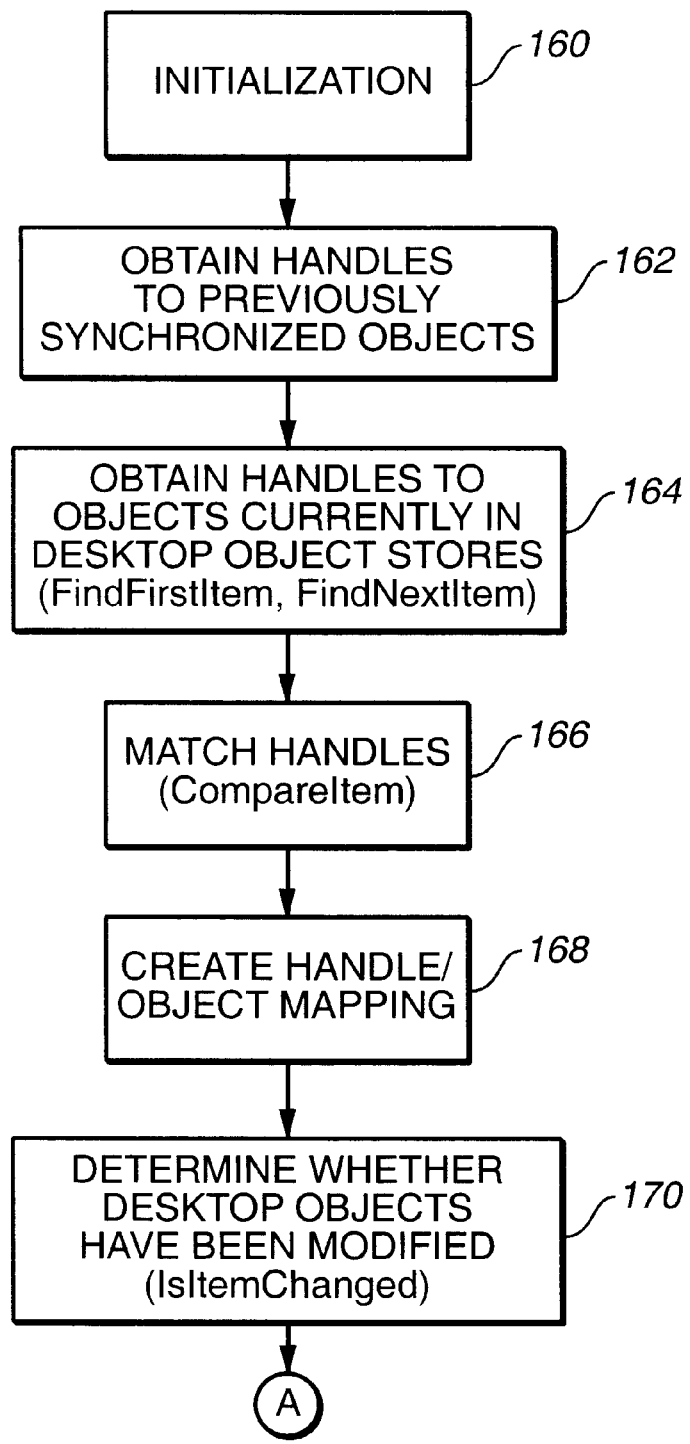
FIG._7A

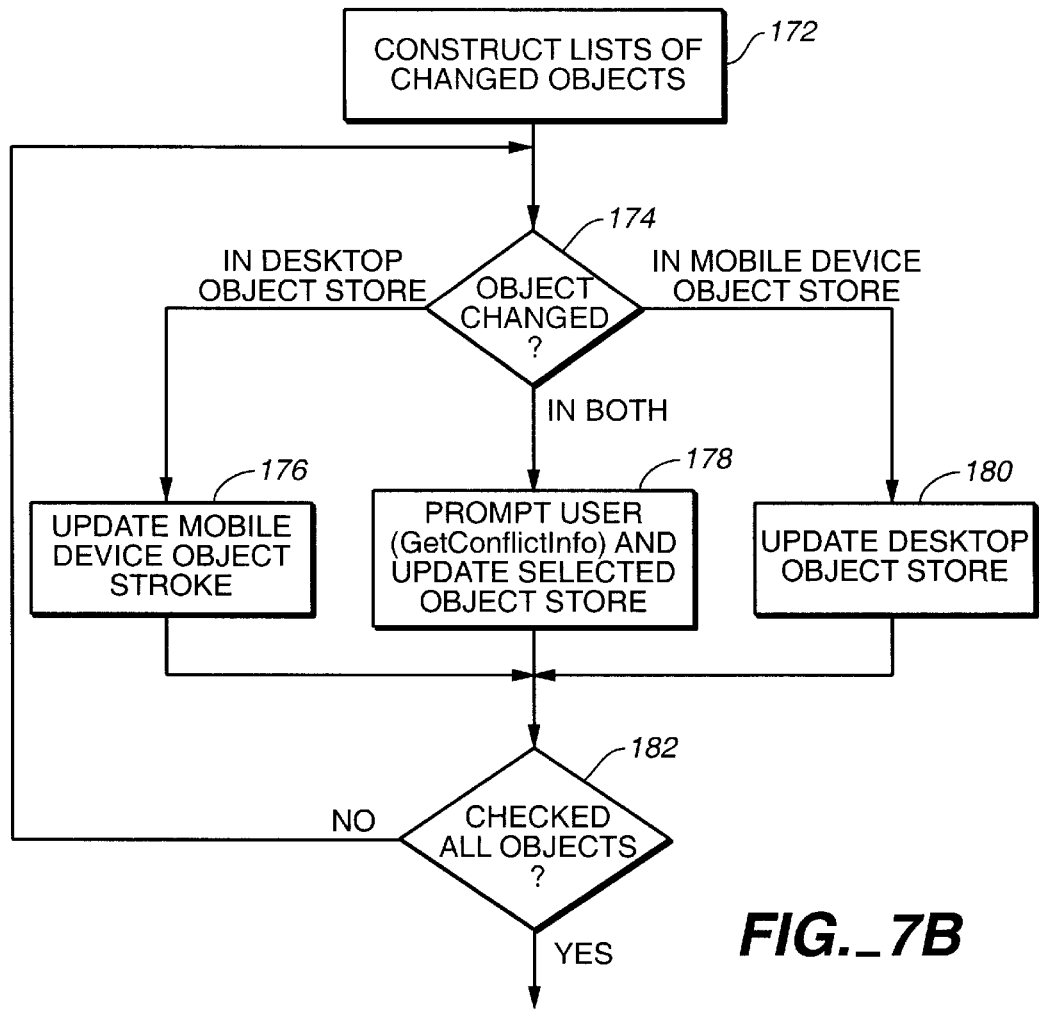
FIG._7B
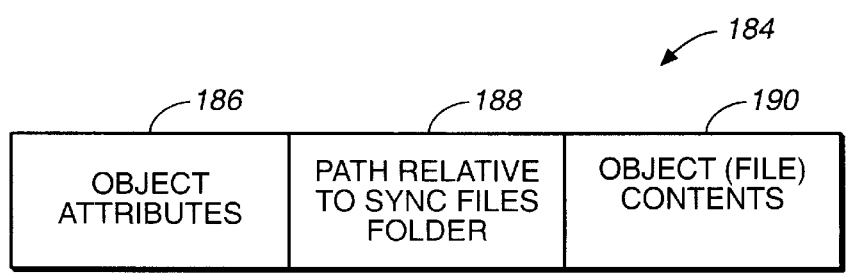
FIG._8

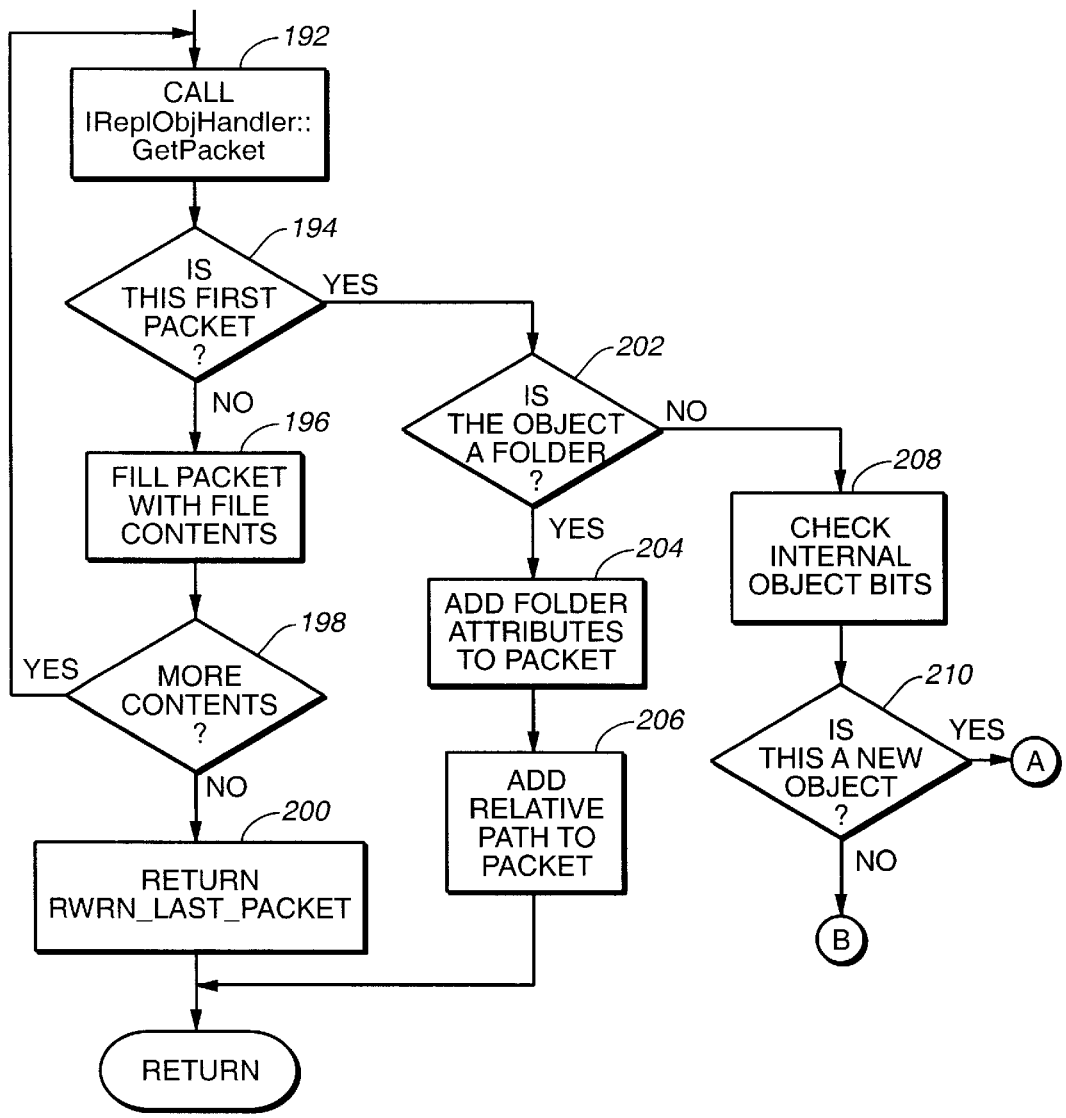
FIG._9A

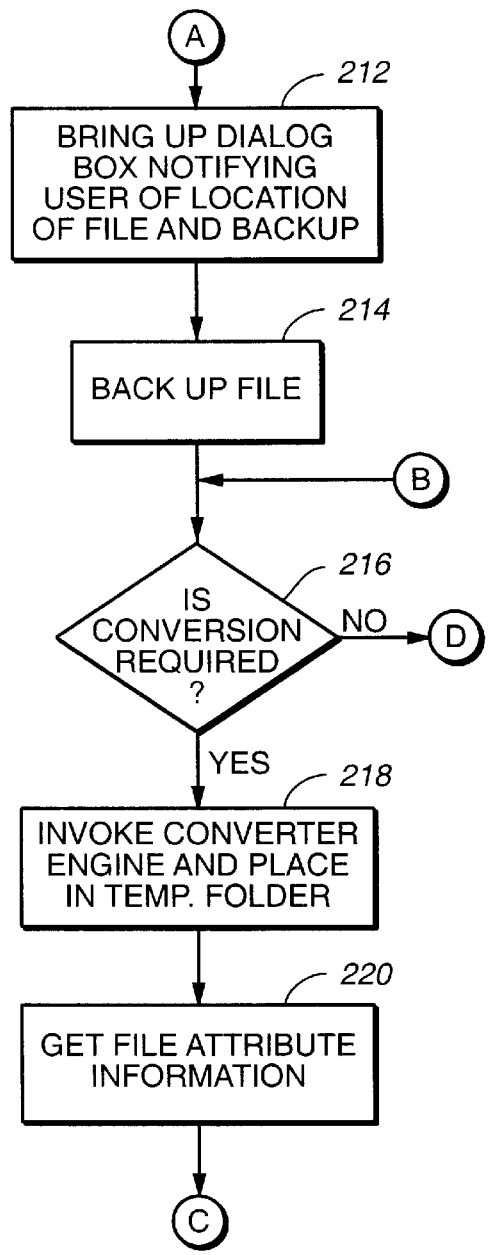
FIG._9B
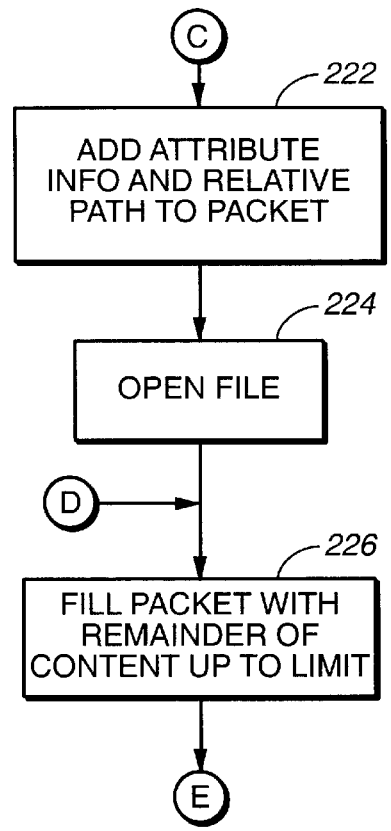
FIG._9C

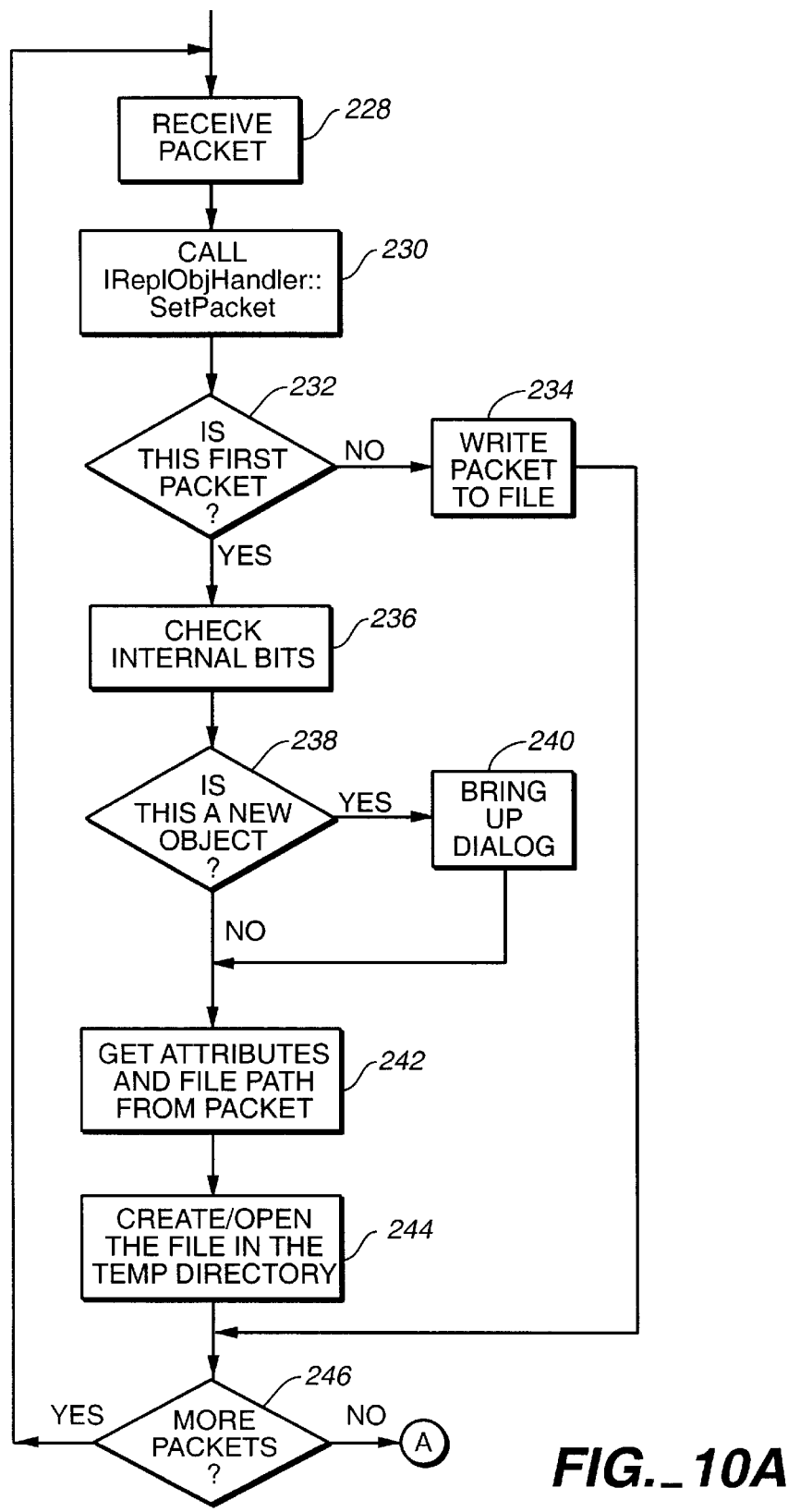
FIG._10A

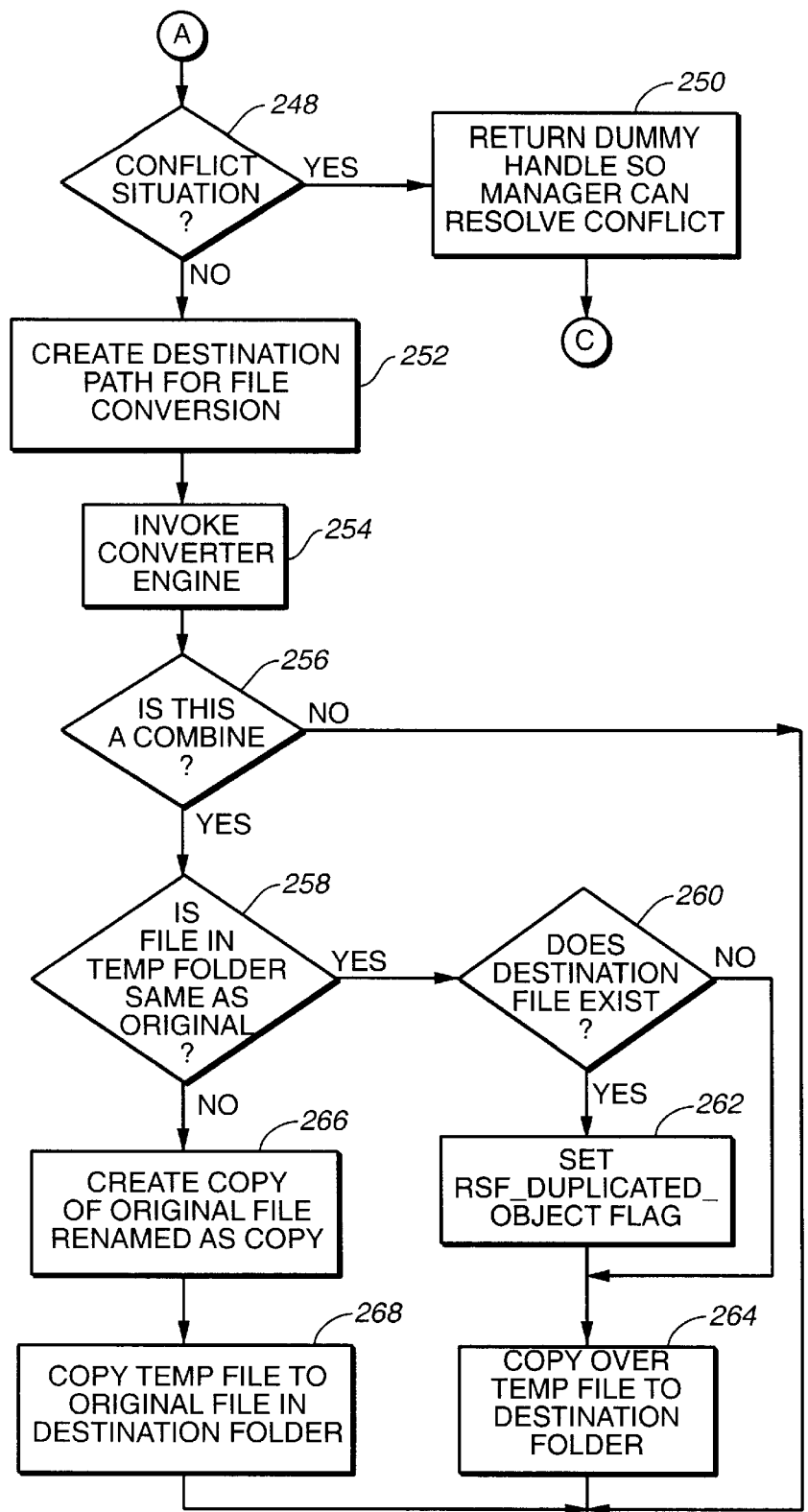
FIG._10B

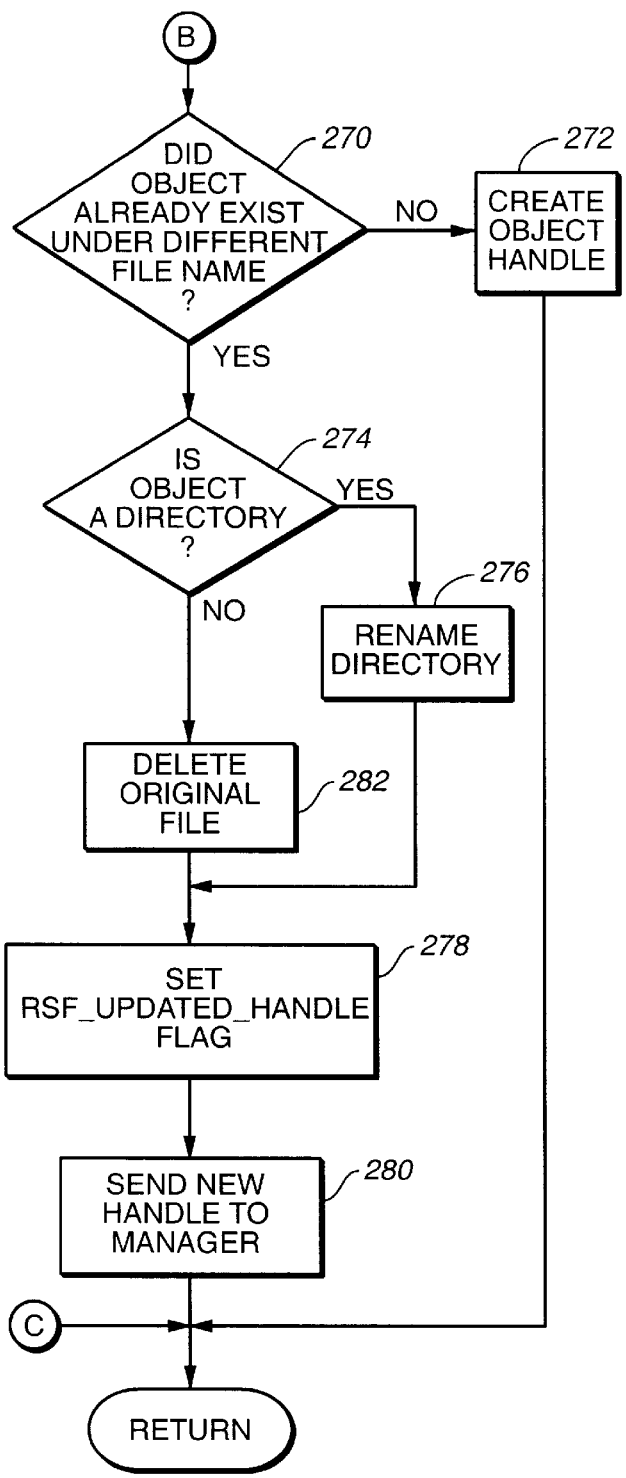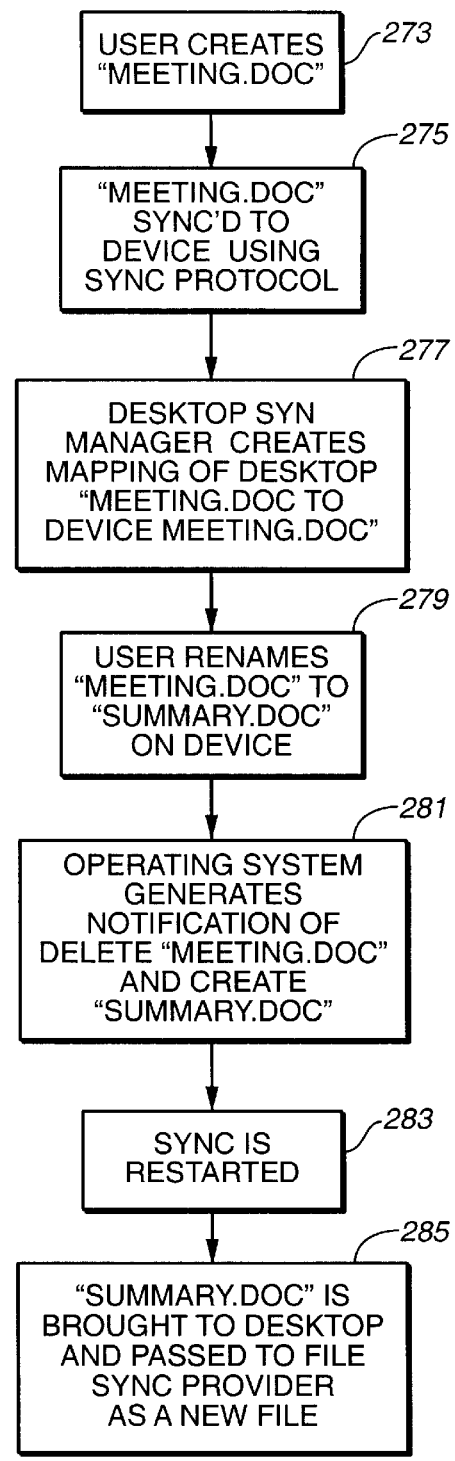
FIG._10C    FIG._10D

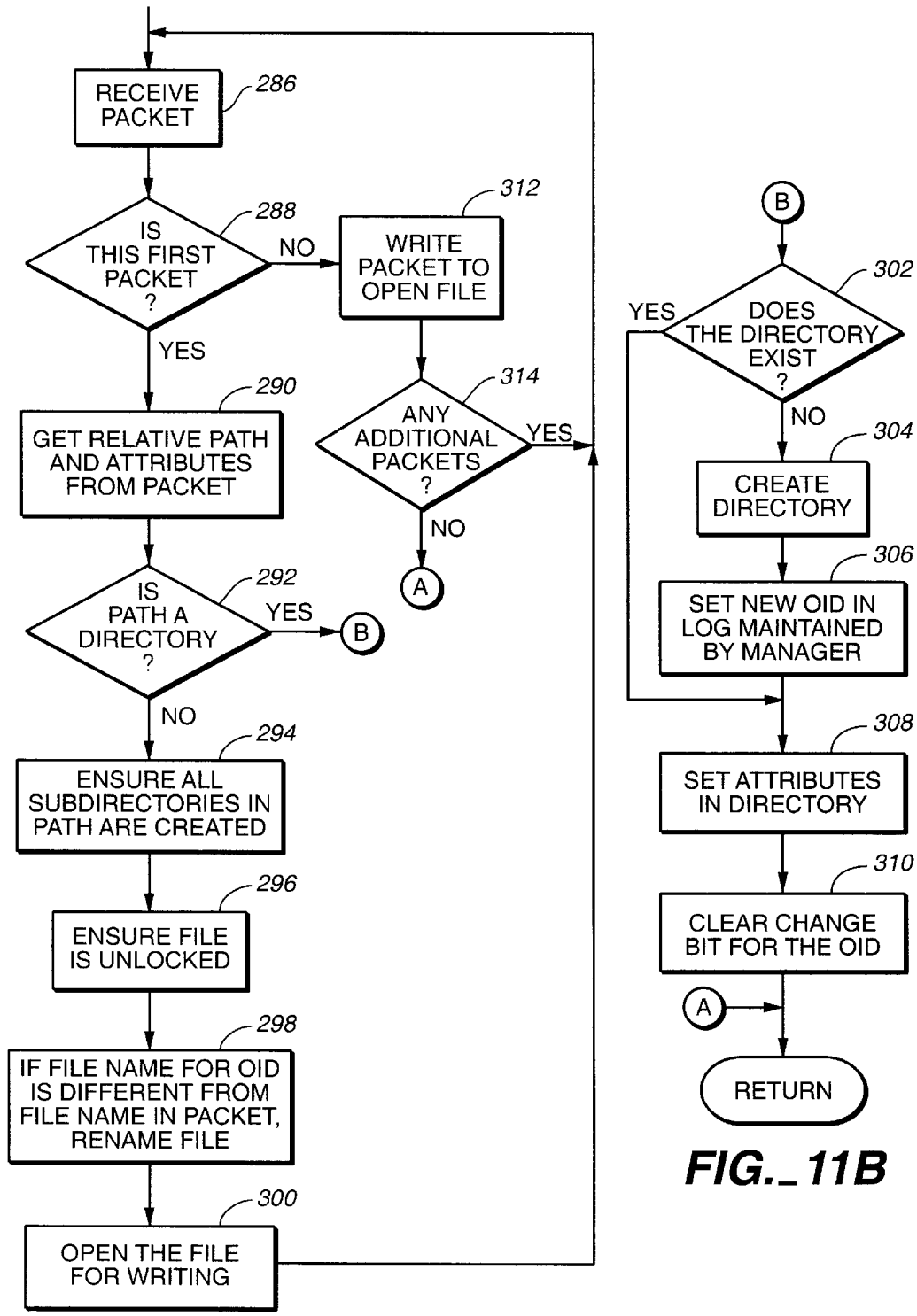
FIG._11A
FIG._11B

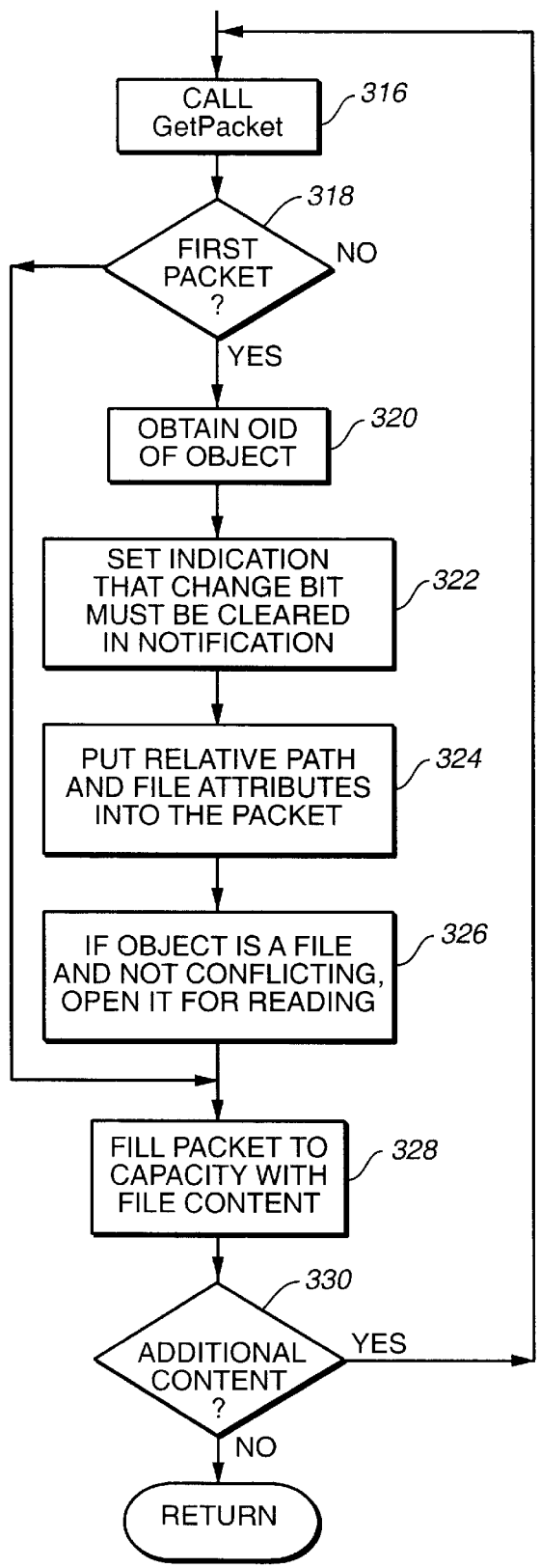
FIG._12
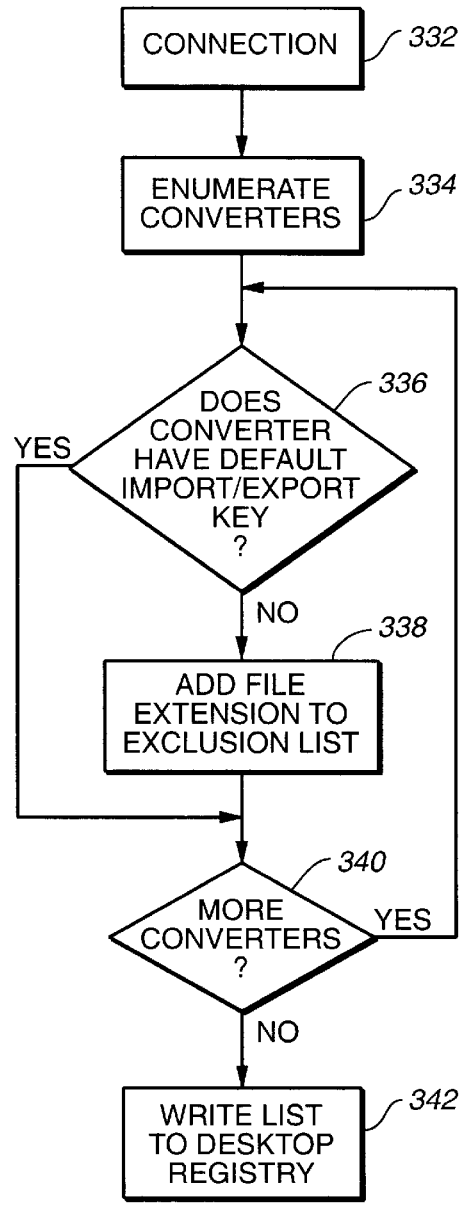
FIG._13

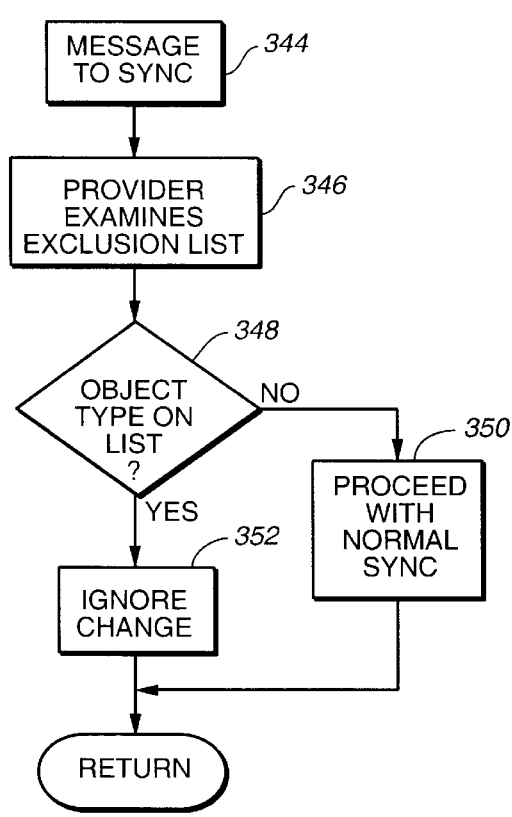
FIG._14
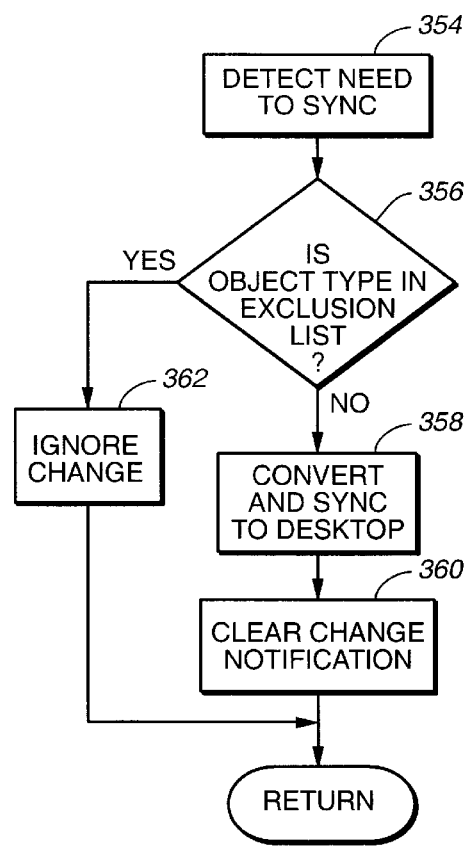
FIG._15

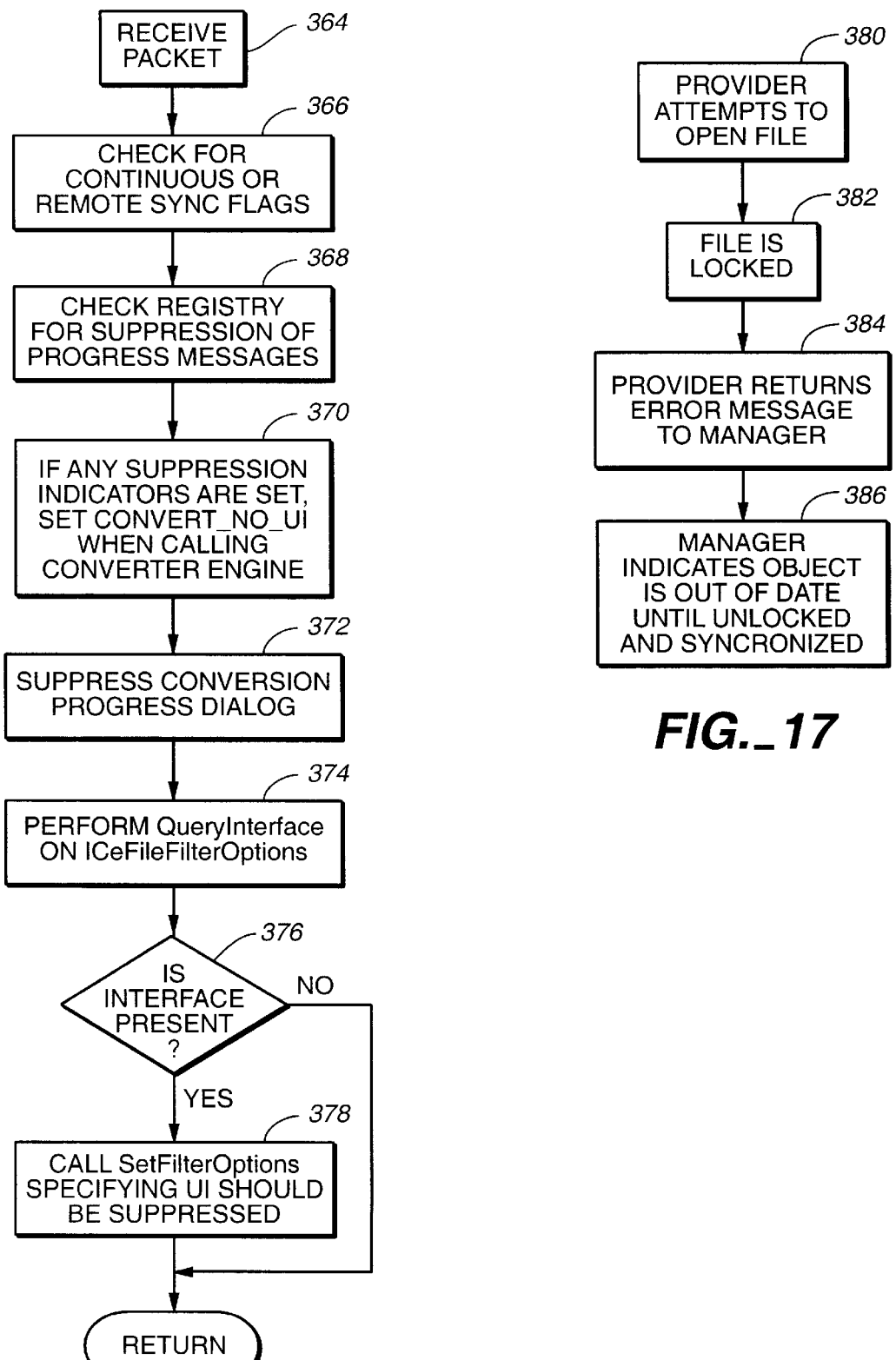
FIG._16
FIG._17

FILE OBJECT SYNCHRONIZATION BETWEEN A DESKTOP COMPUTER AND A MOBILE DEVICE

REFERENCE TO CO-PENDING PATENT APPLICATION

Reference is hereby made to the following co-pending U.S. patent applications:

Ser. No. 08/944,948 filed on Jul. 2, 1997, entitled "OBJECT SYNCHRONIZATION BETWEEN OBJECT STORES ON DIFFERENT COMPUTERS";

Ser. No. 08/953,655 filed on Oct. 27, 1997, entitled "CONTINUOUS OBJECT SYNCHRONIZATION BETWEEN OBJECT STORES ON DIFFERENT COMPUTERS";

Ser. No. 09/058,613, filed on Apr. 10, 1998, entitled ELECTRONIC MAIL OBJECT SYNCHRONIZATION BETWEEN A DESKTOP COMPUTER AND MOBILE DEVICE;

All of which are assigned to the same assignee as the present invention.

BACKGROUND OF THE INVENTION

The present invention relates to synchronization of objects between object stores on two different computing devices. More particularly, the present invention relates to synchronization of objects which represent file data between an object store on a desktop-type computer and an object store on a mobile device.

Mobile devices are small electronic computing devices often referred to as personal digital assistants. Many such mobile devices are pagers, hand held devices, or palm size devices, which comfortably fit within the hand. One commercially available device is sold under the mark "HAND-HELD PC" (or "H/PC"), another is sold under the mark "PALM-SIZE PC" (or "P/PC"), both having software provided by Microsoft Corporation of Redmond, Wash.

Generally, the mobile device includes a processor, random access memory (RAM), and an input device such as a keyboard, touchpad or input buttons and a display. The keyboard can be integrated with the display, such as when the keyboard is incorporated as a touch sensitive display. A communication interface is optionally provided and is commonly used to communicate with the desktop computer. A replaceable or rechargeable battery powers the mobile device. optionally, the mobile device can receive power from an external power source that overrides or recharges the built-in battery.

In some prior applications, the mobile device is used in conjunction with the desktop computer. For example, the user of the mobile device may also have access to, and use, a desktop computer at work or at home or both. The user may typically run the same types of applications on both the desktop computer and on the mobile device. Thus, it is quite advantageous for such mobile devices to be designed to be coupled to the desktop computer to exchange information with, and share information with, the desktop computer.

While a wide variety of computing tasks and applications can be performed by such mobile devices, personal information managers (PIMs) are particularly well suited to mobile devices. PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the trademarks "MICROSOFT SCHEDULE+" and "MICROSOFT OUTLOOK" and are commercially available from Microsoft Corporation of Redmond, Wash. In addition to PIMs, however, such mobile devices may also run different types of applications, such as word processors, spread sheets, etc. Some such applications include those sold under the trademarks "POCKET WORD" and "POCKET EXCEL", both of which are commercially available from Microsoft Corporation of Redmond, Wash.

The user may also typically make changes to the PIMs and other applications both on the mobile device and at the desktop. Therefore, it is advantageous for data stores associated with the PIMs and applications on both the mobile device and the desktop to contain the most up-to-date information, regardless of whether recent changes to the PIMs and other applications have been made on the mobile device or on the desktop computer. The process of coupling the mobile device with the desktop computer, and integrating the information stored by the PIMs on the mobile device and the desktop computer such that the two contain the same updated information is referred to as synchronization.

Synchronization of information in object stores in general, and synchronization of electronic mail objects are discussed at length in the above-identified patent applications. However, a number of problems present themselves when attempting to synchronize data files across diverse functional systems (e.g., across two different and normally incompatible computer architectures). For example, data files lack a unique, persistent object identifier associated with a file. The file name is typically used as the object identifier, and as such is very susceptible to identity loss simply by renaming the file. This affects many core data base operations, such as object copy, object move, and object compare operations, rendering all such operations suspect.

Another problem is presented during conversion of the file content based on the target device. In other words, in many cases, the programs on the different devices utilizing the object may not have a one-to-one correspondence. Thus, the form of the object must be converted before it is transferred from one object store (such as the desktop object store) to another object store (such as the device object store). Inherent in this conversion is the potential loss of fidelity from the original data file. In addition, conversion can also contribute to the problem of having no unique, persistent object identifier. For example, it may be desirable to provide the user with multiple conversion choices. However, the multiple conversion choices can result in different file extensions, thus resulting in another file name change.

In addition, some conversion engines provide a user interface, during conversion, which requests or requires user input. In the event that the mobile device is being remotely synchronized to the desktop computer, this presents a problem in that the user may not be present at the desktop to interact with the user interface generated by the conversion engine.

In addition, many conventional data files can be locked. In other words, files can be rendered read only files which cannot be written for any number of reasons. For example, where a word processing document is being used by one user at a different station, and a second user accesses the word processing document, the word processing document may be locked to the second user, rendering it read only, until the first user relinquishes control of the file.

Therefore, attempted synchronization of this document would be impossible, since the document cannot be written to and thus cannot be updated during the synchronization process. This problem can be exacerbated in a synchronization architecture which provides a continuous synchronization mode while the desktop and mobile device are connected to one another.

Similarly, if a continuous synchronization mode is provided between the desktop and mobile device, the bandwidth of the devices can be taken up by continuous synchronization of non-relevant files, such as temporary files and shortcuts. This deteriorates the performance of the system.

SUMMARY OF THE INVENTION

First and second computing devices each contain an object store which store objects indicative of file data. Synchronization components are provided to synchronize the objects while efficiently overcoming problems associated with synchronizing files.

In one embodiment, file renames are detected to avoid unnecessary duplication of files. In another embodiment, file conversions are performed while suppressing UI during a remote synchronization. Further, registered converters are identified to avoid unwanted loss of data when synchronizing a converted file. Also, locked files are identified and an error message is generated so synchronization of the locked file can be performed during a subsequent synchronization operation. In yet another embodiment, non-relevant files are not synchronized to avoid undesirable consumption of bandwidth during a continuous synchronization process.

BRIEF DESCRIPTION OF THE DRAWINGS

FIG. 1 is a block diagram illustrating a basic environment of the present invention.

FIG. 2 is a block diagram of one embodiment of a conventional desktop computer used in conjunction with a mobile device in accordance with the present invention.

FIG. 3 is a simplified pictorial illustration of one embodiment of a mobile device in accordance with the present invention.

FIG. 4 is a simplified block diagram of one embodiment of the mobile device shown in FIG. 3.

FIG. 5 is a simplified pictorial illustration of another embodiment of a mobile device in accordance with the present invention.

FIG. 6 is an architectural block diagram illustrating one embodiment of portions of the desktop computer shown in FIG. 2 and the mobile device shown in FIGS. 3–5 to illustrate synchronization of information stored in object stores on the desktop computer and the mobile device in accordance with one embodiment of the present invention.

FIGS. 7A and 7B are flow diagrams illustrating a normal synchronization operation in accordance with one embodiment of the present invention.

FIG. 8 illustrates a data structure which describes a packet transmitted during a synchronization operation in accordance with one embodiment of the present invention.

FIGS. 9A–9C are flow diagrams illustrating one embodiment of formulating packets on the desktop computer shown in FIG. 2 in accordance with the present invention.

FIGS. 10A–10C are flow diagrams illustrating receipt of packets during synchronization from a mobile device in accordance with one embodiment of the present invention.

FIG. 10D is a flow diagram illustrating renaming of a file in the context of a synchronization operation.

FIGS. 11A–11C are flow diagrams illustrating formulation of a packet on a mobile device in accordance with one embodiment of the present invention.

FIGS. 12A–12C are flow diagrams illustrating receipt of packets on a mobile device from a desktop computer in accordance with one embodiment of the present invention.

FIG. 13 is a flow diagram illustrating the creation of an exclusion list in accordance with one embodiment of the present invention.

FIG. 14 is a flow diagram illustrating the utilization of the exclusion list created in FIG. 13 on a desktop computer in accordance with one embodiment of the present invention.

FIG. 15 is a flow diagram illustrating the utilization of the exclusion list created in FIG. 13 on a mobile device in accordance with one embodiment of the present invention.

FIG. 16 is a flow diagram illustrating the suppression of a user interface during a remote convert operation in accordance with one embodiment of the present invention.

FIG. 17 is a flow diagram illustrating attempted synchronization of a file, which is locked, in accordance with embodiment of the present invention.

DETAILED DESCRIPTION OF THE ILLUSTRATIVE EMBODIMENTS

Overview

FIG. 1 is a block diagram of a typical system or environment 10 in which the present invention operates. System 10 includes mobile device 12 and desktop computer 14. Mobile device 12 includes first application program 16, second application program 18, corresponding first and second object stores 20 and 22, synchronization engine 24 and communication link 26. Desktop computer 14 includes first and second application programs 28 and 30, corresponding first and second object stores 32 and 34, synchronization engine 36 and communication link 38. It will be appreciated that both device 12 and desktop computer 14 include a number of other components, which are discussed in greater detail below. However, for the purposes of the overview discussion presented with respect to FIG. 1, the items set out above are sufficient.

In one illustrative embodiment of the present invention, application programs 16 and 28 are personal information manager (PIM) programs which support, for example, electronic mail messaging, scheduling, calendering, etc. Hereinafter, programs 16 and 28 will simply be referred to as PIMs 16 and 28. Of course, PIMs 16 and 28 can be configured to support a wide variety of other features, such as task lists and personalized address books, to name a few.

Object stores 20 and 32 are implemented in memory configured to store a plurality of individual records or objects, each comprising a plurality of fields or properties related to PIMs 16 and 28. In one illustrative embodiment, PIMs 16 and 28 are programs, such as that available under the commercial designation "POCKET OUTLOOK 97" and "MICROSOFT OUTLOOK 97", respectively and object stores 20 and 23 are configured to store objects, each of which having a plurality of attributes or properties associated with electronic mail messaging, such as a sender's name, the recipient's name, text messages, etc. Desktop computer 14 executes PIM 28 to maintain objects stored in store 32, and device 12 executes program 16 to maintain objects stored in object store 20. In one illustrative embodiment, each object in object store 20 comprises the same set of properties or attributes stored in object store 32, or a subset of those properties or attributes.

Similarly, application programs 18 and 30 maintain objects on associated object stores 22 and 34, respectively. In one illustrative embodiment, application programs 18 and 30 are file system applications, such as those available under the commercial designations "MICROSOFT POCKET WORD" and "MICROSOFT WORD", respectively. It should also be noted that any suitable number of other application programs, and associated object stores, can be provided on device 12 and desktop 14. However, for the sake of simplicity, only programs 16, 18, 28 and 30, and their associated object stores, are described herein.

In one illustrative embodiment, the user desires to synchronize object stores 20 and 32 and object stores 22 and 34. Thus, there are two instance of each object associated with the pair of object stores 20 and 32 (one instance in object store 20 and one instance in object store 32) and two instances of each object associated with the pair of object stores 22 and 34 (one instance in object store 22 and one instance in object store 34). When a user changes one instance of the object stored in either object store 22 or 34, the second instance of that object in the other of stores 22 and 34 is out of date and is desirably updated the next time mobile device 12 is connected to desktop computer 14, so that both instances of the same object contain up-to-date data. The same is true for instances of objects stored in object stores 20 and 32. The process by which the out of date instance is updated is referred to as synchronization.

In order to accomplish synchronization, synchronization components 24 and 36 run on mobile device 12 and desktop computer 14, respectively. The synchronization components communicate with application programs 16, 18, 28 and 30 (or directly with the associated object stores) through well defined interfaces (discussed in greater detail below) to manage communication and synchronization.

Synchronization components 24 and 36 communicate with each other through communication links 26 and 38 which are disposed on device 12 and desktop computer 14, respectively. Communication links 24 and 38 are illustratively commercially available communication links using a suitable communications protocol. For instance, in one illustrative embodiment, mobile device 12 is connected to desktop computer 14 with a physical cable which communicates using a serial communications protocol. Other communication mechanisms are also contemplated by the present invention, such as infra-red (IR) communication, direct modem communication, remote dial-up-networking communication, communication through commercially available network cards (i.e., using TCP/IP), remote access services (RAS), wireless modem, wireless cellular digital packet data (CDPD), or other suitable communication mechanisms.

Prior to discussing the synchronization process and associated mechanisms in greater detail, the present discussion proceeds with respect to a more detailed description of the components of mobile device 12 and desktop computer 14 for the sake of clarity.

Desktop Computer 14

FIG. 2 and the related discussion are intended to provide a brief, general description of a suitable desktop computer 14 in which portions of the invention may be implemented. Although not required, the invention will be described, at least in part, in the general context of computer-executable instructions, such as program modules, being executed by a personal computer 14 or mobile device 12. Generally, program modules include routine programs, objects, components, data structures, etc. that perform particular tasks or implement particular abstract data types. Moreover, those skilled in the art will appreciate that desktop computer 14 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing desktop computer 14 includes a general purpose computing device in the form of a conventional personal computer 14, including processing unit 62, a system memory 64, and a system bus 66 that couples various system components including the system memory to the processing unit 62. The system bus 66 may be any of several types of bus structures including a memory bus or memory controller, a peripheral bus, and a local bus using any of a variety of bus architectures. The system memory 64 includes read only memory (ROM) 68 a random access memory (RAM) 70. A basic input/output system (BIOS) 72, containing the basic routine that helps to transfer information between elements within the desktop computer 14, such as during start-up, is stored in ROM 68. The desktop computer 14 further includes a hard disk drive 74 for reading from and writing to a hard disk (not shown) a magnetic disk drive 76 for reading from or writing to removable magnetic disk 78, and an optical disk drive 80 for reading from or writing to a removable optical disk 82 such as a CD ROM or other optical media. The hard disk drive 74, magnetic disk drive 76, and optical disk drive 80 are connected to the system bus 66 by a hard disk drive interface 84, magnetic disk drive interface 86, and an optical drive interface 88, respectively. The drives and the associated computer-readable media provide nonvolatile storage of computer readable instructions, data structures, program modules and other data for the desktop computer 14.

Although the exemplary environment described herein employs a hard disk, a removable magnetic disk 78 and a removable optical disk 82, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 78, optical disk 82, ROM 68 or RAM 70, including an operating system 90, one or more application programs 92 (which include PIM 28 and program 30), other program modules 94, and program data 96. A user may enter commands and information into the desktop computer 14 through input devices such as a keyboard 40, pointing device 42 and microphone 43. Other input devices (not shown) may include a joystick, game pad, satellite dish, scanner, or the like. These and other input devices are often connected to the processing unit 62 through a serial port interface 46 that is coupled to the system bus 66, but may be connected by other interfaces, such as a sound card, a parallel port, game port or a universal serial bus (USB) A monitor 47 or other type of display device is also connected to the system bus 66 via an interface, such as a video adapter 48. In addition to the monitor 47, desktop computers may typically include other peripheral output devices such as speaker 45 and printers.

The desktop computer 14 may operate in a networked environment using logic connections to one or more remote computers (other than mobile device 12), such as a remote computer 49. The remote computer 49 may be another personal computer, a server, a router, a network PC, a peer device or other network node, and typically includes many or all of the elements described above relative to desktop computer 14, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network intranets and the Internet.

When used in a LAN networking environment, the desktop computer 14 is connected to the local area network 51 through a network interface or adapter 53. When used in a WAN networking environment, the desktop computer 14 typically includes a modem 54 or other means for establishing communications over the wide area network 52, such as the Internet. The modem 54, which may be internal or external, is connected to the system bus 66 via the serial port interface 46. In a network environment, program modules depicted relative to desktop computer 14, or portions thereof, may be stored in the remote memory storage devices. It will be appreciated that the network connections shown are exemplary and other means of establishing a communications link between the computers may be used.

Desktop computer 14 runs operating system 90 that is typically stored in non-volatile memory 68 and executes on the processor 62. One suitable operating system is a "WINDOWS" brand operating system sold by Microsoft Corporation, such as "WINDOWS 95" or "WINDOWS NT", operating systems, other derivative versions of "WINDOWS" brand operating systems, or another suitable operating system. Other suitable operating systems include systems such as the Macintosh OS sold from Apple Corporation, and the OS/2 Presentation Manager sold by International Business Machines (IBM) of Armonk, N.Y. PIM 28 and application 30 are preferably stored in program module 94, in volatile memory or non-volatile memory, or can be loaded into any of the components shown in FIG. 2 from a floppy diskette 78, CDROM drive 80, downloaded from a network via network adapter 53, or loaded using another suitable mechanism.

Dynamically linked libraries (DLLs), comprising a plurality of executable functions are associated with PIM 28 and application 30 for execution by processor 62. Interprocessor and intercomponent calls are facilitated preferably using the component object model (COM) as is common in programs written for Microsoft "WINDOWS" brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLLs associated with PIM 28 and program 30 are designed specifically to work in conjunction with PIM 28 and program 30 and to expose desktop synchronization interfaces that function according to a synchronization protocol. The DLLs, in turn, call interfaces exposed by PIM 28 and program 30 in order to access data representing individual properties of objects maintained in object stores 32 and 34. Object stores 32 and 34, of course, can reside in any one of the suitable memory components described with respect to FIG. 2.

Mobile Device 12

FIG. 3 is a simplified pictorial illustration of one preferred embodiment of a mobile device 12 which can be used in accordance with the present invention. Mobile device 12, as illustrated in FIG. 3, can be a desktop assistant sold under the designation "H/PC" having software provided by the Microsoft Corporation. In one embodiment, mobile device 12 includes a miniaturized keyboard 100, display 102 and stylus 104. In the embodiment shown in FIG. 3, display 102 is a liquid crystal display (LCD) which uses a contact sensitive display screen in conjunction with stylus 104. Stylus 104 is used to press or contact the display 102 at designated coordinates to accomplish certain user input functions. Miniaturized keyboard 100 is illustratively implemented as a miniaturized alpha-numeric keyboard, with any suitable and desired function keys which are also provided for accomplishing certain user input functions.

FIG. 4 is a more detailed block diagram of mobile device 12. Mobile device 12 illustratively includes microprocessor 106, memory 108, input/output (I/O) components 110, communication link 26, wireless receiver 112 and antenna 114. These components of mobile device 12 can be coupled for communication with one another over a suitable bus 116.

Memory 108 is preferably implemented as non-volatile electronic memory such as random access memory (RAM) with a battery back-up module (not shown) such that information stored in memory 108 is not lost when the general power to mobile device 12 is shut down. A portion of memory 108 is illustratively allocated as addressable memory for program execution, while another portion of memory 108 is optionally used for storage, such as to simulate storage on a disc drive.

Memory 108 can include operating system 118, one or more application programs 42 (such as PIM 16 and file application 18, etc.), as well as object stores 20 and 22 and sync engine 24. During operation, operating system 118 is illustratively executed by processor 106 from memory 108. Operating system 118, in one embodiment, is a "WINDOWS CE" brand operating system commercially available from Microsoft Corporation. The operating system 118 is designed for mobile devices, and implements features which can be utilized by PIM 16 and file application 18 through a set of exposed application programming interfaces and methods. The objects in object stores 20 and 22 are illustratively maintained by PIM 16, file application 18 and operating system 118, at least partially in response to calls to the exposed application programming interfaces and methods.

I/O components 110, in one embodiment, are provided to facilitate input and output operations from a user of mobile device 12. I/O components 110 for various embodiments of mobile device 12 are described in greater detail with respect to FIGS. 3 and 5.

Communication link 26 is optionally provided as any suitable communication interface. Interface 26 is illustratively used to communicate with desktop computer 14 as described with respect to FIG. 1. Wireless receiver and driver 112 and antenna 114 are used for communicating wirelessly.

FIG. 5 is another simplified pictorial illustration of mobile device 12 in accordance with another embodiment of the present invention. Mobile device 12, as illustrated in FIG. 5, includes some items which are similar to those described with respect to FIG. 3, and are similarly numbered. For instance, mobile device 12, as shown in FIG. 5, also includes touch sensitive screen 102 which can be used, in conjunction with stylus 104, to accomplish certain user input functions. When mobile device 12 is implemented as a pager, screen 102 is not illustratively touch sensitive and stylus 104 is not needed.

It should be noted that the display 102 for the mobile devices shown in FIGS. 3 and 5 can be the same size as one another, or different sizes from one another, but would typically be much smaller than a conventional display used with a desktop computer. For example, displays 102 shown in FIGS. 3 and 5 may be defined by a matrix of only 240X320 coordinates, or 160X160 coordinates, or any other suitable size. When mobile device 12 is a pager, display 102 may be even smaller.

The mobile device 12 shown in FIG. 5 also includes a number of user input keys or buttons (such as scroll buttons 120) which allow the user to scroll through menu options or other display options which are displayed on display 102, or which allow the user to change applications or select user input functions, without contacting display 102. In addition, the mobile device 12 shown in FIG. 5 also illustratively includes a power button 122 which can be used to turn on and off the general power to the mobile device 12.

It should also be noted that, in the embodiment illustrated in FIG. 5, mobile device 12 includes a hand writing area 124. Hand writing area 124 can be used in conjunction with stylus 104 such that the user can write messages which are stored in memory 108 for later use by the mobile device 12. In one illustrative embodiment, the hand written messages are simply stored in hand written form and can be recalled by the user and displayed on the display screen 102 such that the user can review the hand written messages entered into the mobile device 12. In another embodiment, mobile device 12 is provided with a character recognition module such that the user can enter alpha-numeric information into mobile device 12 by writing that alpha-numeric information on area 124 with stylus 104. In that instance, a character recognition module in the mobile device 12 recognizes the alpha-numeric characters and converts the characters into computer recognizable alpha-numeric characters which can be used by the application programs 16, 18 in mobile device 12.

Of course, where mobile device 12 is implemented as a pager, stylus 104 and handwriting area 124 are not needed. Instead, mobile device 12 can be simply provided with screen 102, user input buttons 120, power button 122, and a compact physical housing or case.

Overview of Synchronization

FIG. 6 is a more detailed block diagram of sync engine 24 on mobile device 12 and sync engine 36 on desktop 14. Sync engine 24 on mobile device 12 includes synchronization manager 140 which is coupled to a set of application programs, such as PIM sync provider 144 and file sync provider 146. PIM sync provider 144 is coupled to PIM object store 20, and file sync provider 146 is coupled to file object store 122.

Sync engine 36 on desktop 14 also includes a synchronization manager 148 coupled to an associated reference store 150 and also coupled to application programs, including PIM sync provider 152 and file sync provider 154. PIM sync provider 152 is coupled to PIM object store 32, and file sync provider 154 is coupled to file object store 34. While providers 144, 146, 152 and 154 are shown coupled directly to associated object stores, those providers could also be coupled to the object stores through the application programs 16, 18, 28 and 30 instead. However, for the sake of simplicity, the present discussion proceeds only with respect to the arrangement shown in FIG. 6.

Sync providers 152 and 154 expose application programming interfaces (APIs) 156 which can be called by sync manager 148 to read and store objects and object properties on object stores 32 and 34. The interfaces 156 generally allow the creation of data bases for different types of objects, and allow application programs to read and write property names and values to and from respective objects within each data base.

The interfaces are well documented as the IReplStore, and IReplObjHandler interfaces. Each of these interfaces exposes a number of well documented methods. For example, the IReplStore interface exposes 22 methods which can be generally classified as methods which are used to manipulate the data store, methods used for object enumeration, methods used to obtain object information, methods used to manipulate handles to objects, methods used for user interface functions, and a number of miscellaneous methods. The IReplObjHandler interface exposes methods which are used to serialize objects by turning an object into a series of bytes, and to deserialize objects by turning the series of bytes back into an object. The methods included in the interface are also used to delete an object from the corresponding object store.

Sync manager 148, in turn, exposes a well documented interface known as the IReplNotify interface to providers 152 and 154. This interface exposes four well documented methods which are used to notify sync manager 148 of any change or deletion made to an object in a corresponding object store, to set text to be displayed in a status bar where synchronization status can be observed by the user, to obtain a window handle which is used as a parent window of any modal dialogue or message box, and to obtain information about a mobile device which has been selected, or which is connected to the desktop.

Each of the providers 152 and 154 are implemented to specifically work in conjunction with a particular application program 28 or 34, respectively. In general, because the application program interface (API) 156 is standardized, it allows synchronization manager 148 to access and synchronize any number of different desktop application programs, as long as the required interface methods are implemented for each application by corresponding providers.

On mobile device 12, providers 144 and 146 also provide the well documented IReplObjHandler interface such that objects in the associated object stores 20 and 22 can be serialized and deserialized. Providers 144 and 146 also illustratively implement three additional functions which can be used to initialize and terminate the provider, to handle object identification and change detection, and to retrieve device information about a particular object type. These functions and interfaces are also well documented.

Synchronization manager 148 manipulates reference store 150 to maintain a mapping between instances of objects stored in object stores 32 and 34 on desktop 14 and instances of the same objects stored in object stores 20 and 22 on mobile device 12. Objects are identified by handles which are created by providers 152 and 154. The handles are opaque to synchronization manager 148, in that synchronization manager 148 need not be concerned with the actual composition of the handles although the handles are manipulated and stored by synchronization manager 148.

Generally, in order to maintain the mapping, synchronization manager 148 maintains reference store 50 so that it contains handles corresponding espectively to a plurality of objects in the object stores 32 and 34 on desktop 14 which are to be synchronized with instances of the same objects in object stores 20 and 22 on mobile device 12. The handles in reference store 150 will typically correspond to objects that have been previously synchronized between the various object stores. The handles are updated after their corresponding objects have been synchronized.

The list of handles maintained in reference store 150 is also used to determine which items need to be synchronized to mobile device 12 the next time mobile device 12 is connected to desktop computer 14. In making this determination, synchronization manager 148 also determines whether objects have been added to or deleted from the object stores so that appropriate additions and deletions can be made.

The handles stored in reference store 150 should be formatted in accordance with the following criteria so that the desktop synchronization providers 152 and 154 can perform the specified functions:

(a) Each handle should contain data that uniquely identifies an object—such as an object identifier, an ID number, a full pathname for a file system object, etc. This data should be persistent (in that it does not change for a particular object) and should not be reused for subsequently created objects. This data can be compared to determine whether two handles actually correspond to the same object. As is discussed below, this can be problematic for file system information, because the object identifier is typically the pathname, and can be changed simply by renaming the file.

(b) It should be possible to derive some object order based on the handle. This is required for efficient searching, as will be described below.

(c) The handle should have some sort of time stamp information, or version number. This information can be compared to determine whether an object has changed since the last handle was recorded in reference store 150.

These handles are provided from providers 152 and 154 to synchronization manager 148, for storage in reference store 150, during an enumeration process which is described below. This enumeration process is used to detect items which need to by synchronized when mobile device 12 is next coupled to desktop computer 14.

FIGS. 7A and 7B are flow diagrams illustrating the enumeration process which is periodically performed by sync engine 36 in obtaining and updating the list of handles stored in reference store 150 for the purpose of determining which items need to synchronized upon next connection. After an initialization step indicated by block 160, synchronization manager 148 constructs two lists of handles. The first list is obtained at step 162 by accessing the handles previously stored in reference store 150 which correspond to objects that were previously synchronized. The second list of handles is obtained at step 164 by querying each of the synchronization providers 152–154 using interface methods denoted by IReplobjHandler::FindFirstItem and FindNextItem. When successfully called, these interfaces enumerate an ordered list of handles corresponding respectively to a second group of objects, those objects currently in the object stores 32 and 34 corresponding to the providers 152 and 154 which have enumerated the objects.

By comparing the list of handles returned by the current enumeration with the saved list of handles loaded from reference store 150, synchronization manager 148 automatically detects changes and deletions. For example, each time a new object is returned during enumeration, synchronization manager 148 attempts to find an object in its previously saved list of objects which represents the same object. If no matching handle is found, synchronization manager 148 determines that a new object has been created and saved on the object store which enumerated the object under consideration. In order to determine whether matching handles are found, as is indicated by block 166, synchronization manager 148 calls the interface method IReplStore::CompareItem.

Based on a comparison of the handles, synchronization manager 148 creates any necessary handle-to-object mappings in reference store 150 such that objects in the object stores on desktop 14 can be mapped to corresponding instances of the same object on device 12. This is indicated by block 168.

Synchronization manager 148 also determines whether any objects have been added, deleted, or modified in the particular object store from which they were enumerated. This is indicated by blocks 170. For example, if the list of objects which were previously synchronized contains a handle that is not found in the newly created list based upon a current enumeration of synchronization providers 152–154, that indicates that the object has been deleted from the corresponding data store 32, 34. Thus, synchronization manager 148 determines that the object must also be deleted from the mobile device 12 during the next synchronization operation.

Similarly, if the enumeration of objects produces an object handle which does not occur in the list of objects previously synchronized, then synchronization manager 148 determines that an object corresponding to that particular handle has been added to the desktop object store which enumerated the object. Thus, during the next synchronization operation, the object must be added to mobile device 12.

Synchronization manager 148 also calls the interface method IReplStore::IsItemChanged with matching handles from the first and second lists. Calling this interface causes the appropriate provider 152 or 154 (whichever enumerated the matching handle) to determine whether the object has changed since its handle was last written to reference store 150. In one illustrative embodiment, the provider examines the time stamp information or version number information associated with the object handle. If that information is not identical, that indicates that there has been a change to the object. Thus, during the next synchronization process, synchronization manager 148 must update the corresponding object on mobile device 12 (assuming there is no conflict as discussed below).

Synchronization manager 140 on mobile device 12 also interacts with synchronization providers 144 and 146 to determine whether any objects on object stores 20 and 22 have been added, deleted, or changed since the last synchronization process. On mobile device 14, the "WINDOWS CE" brand operating system posts a message to synchronization manager 140 every time an object on mobile device 12, which is to be synchronized, changes, is added, or is deleted. Synchronization manager 140 enumerates each object and calls methods in the IreplNotify interface of each provider 144 and 146. Based on this call, the provider determines whether the particular object enumerated is to be synchronized and indicates to synchronization manager 140 how many objects are to be synchronized (for example, a file system object, such as a directory, actually contains more than one object which is to be synchronized).

Based on the notifications posted from the operating system, synchronization manager 140 maintains a list, or array, of objects which have changed, deleted, or added since the last synchronization process. Upon connection to desktop computer 14, this list is provided to synchronization manager 148. Thus, synchronization manager 148 contains the lists which have been constructed for both desktop 14 and mobile device 12 which indicate objects which need to be synchronized. This is indicated by block 172 in FIG. 7B.

Synchronization manager 148 then determines, as indicated at block 174, whether an object has changed only on mobile device 12, only on desktop 14, or on both mobile device 12 and desktop 14. If the object has changed only on one of the desktop object stores, then synchronization manager 148 carries out the necessary activity to update the corresponding object store on the mobile device. This is indicated by block 176. If the object has changed only on one of the mobile device stores, then synchronization manager 148 carries out the necessary activities to update the corresponding desktop object store. This is indicated by block 180.

However, if the same object has changed on both mobile device 12 and desktop 14, then a conflict situation arises. In one illustrative embodiment, synchronization manager 148 makes a call to the registry in the operating system of desktop computer 14 to obtain conflict information which instructs synchronization manager 148 how to proceed in the face of a conflict. This is indicated by block 178. For example, the user may have set preferences which indicate that, in the case of a conflict either the desktop computer version, or the mobile device version should take precedence every time. Similarly, the user may have set a preference which indicates that the user is to be notified in the case of a conflict so that the user can actively decide which version will take precedence. In that case, synchronization manager 148 generates a user interface allowing the user to resolve the conflict. Synchronization manager 148 then takes the necessary steps to resolve the conflict and update the appropriate object store. This continues until all objects in the lists of objects to be synchronized have been dealt with. This is indicated by block 182.

In order to exchange objects with mobile device 12, synchronization manager 148 continually calls the method IReplObjHandler:GetPacket to have an appropriate provider 152 or 154 obtain a packet of information to be transmitted to mobile device 12. To handle a packet received from mobile device 12, synchronization manager 148 calls IReplObjHandler::SetPacket. This acts to provide a packet of information received from mobile device 12 to a synchronization provider 154 for storage on its associated object store. Similar interfaces are called by synchronization manager 140 on mobile device 12. These methods are discussed in greater detail below.

EXCHANGING OBJECTS

The present invention primarily deals with problems associated with attempting to synchronize file system data stored in file object store 34 and maintained by file sync provider 154. Thus, the remainder of the present discussion proceeds with respect to file system data only.

File object store 34 and file object store 22 each hold a synchronized files folder which contains a hierarchical list of objects to by synchronized. In other words, a user will typically place an item in that folder if the user wishes the item to be synchronized between desktop computer 14 and mobile device 12. The objects in the synchronized files folder can include directories, subdirectories, files, etc.

In order to packetize this information for transmission between mobile device 12 and desktop 14, the information is arranged into a series of serial bytes, such as packet 184 illustrated in FIG. 8. A first packet illustratively includes object attributes 186, an object path which provides a file name path relative to the synchronized files folder and which is indicated by numeral 188, and object file content 190. In one illustrative embodiment, the entire packet 184 is 4K bytes long. After the first packet 184 is generated, subsequent packets (if any) corresponding to the object simply contain 4K bytes of file content information until the entire object has been transmitted.

FIGS. 9A–9C comprise a flow chart which illustrates the steps performed when synchronization manager 148 transmits an object to mobile device 12. First, synchronization manager 148 calls the function IReplObjHandler::GetPacket as indicated by block 192. Based on this call, file sync provider 154 determines whether this is the first packet of the specified object being transmitted. This is indicated by block 194. If this is not the first object, file sync provider 154 simply fills the packet with the designated amount of file object contents, as indicated by block 196, and returns the packet to synchronization manager 148 for transmission. Provider 154 then determines whether there are any additional contents to be transmitted for the specified object. This is indicated by block 198. If there are additional contents, then synchronization manager 148 again calls the GetPacket function to have another packet prepared for transmission. However, if there are no more contents in the present object, provider 154 returns a value designated by RWRN_LAST_PACKET. This is indicated by block 200 and indicates to sync manager 148 that the object packetization has been completed.

If, at block 194, provider 154 determines that this is the first packet, provider 154 determines whether the object is a folder. This is indicated by block 202. If the object is a folder, provider 154 adds the folder attribute information 186 to the packet being prepared as well as the relative path information 188. The packet is then returned to synchronization manager 148 for transmission to mobile device 12. This is indicated by blocks 204 and 206.

If, at block 202, provider 154 determines that this is not the first packet of a folder, but rather is the first packet of a file, provider 154 reviews the internal object bits in the object to determine whether this is a new object. In other words, provider 154 determines whether this object has been synchronized in the past. This is indicated by blocks 208 and 210.

If this object is a new object, provider 154 causes a user interface dialogue box to be displayed to the user at desktop computer 14 indicating that the object being synchronized is a new object, indicating the location (illustratively by path name) where the new object will reside on device 12, and also indicating that the new object is being backed up and the location of the backup. In one illustrative embodiment, the user may choose not to see this dialog in the future. This is indicated by blocks 212 and 214. If, at block 210, it is determined that the current object is not a new object, provider 154 does not bring up this dialogue box.

Provider 154 then determines whether a conversion is required. For instance, if the file data being synchronized is a word processing document generated using the "MICROSOFT WORD" brand word processor, and they are being synchronized to a device running the "WINDOWS CE" brand operating system and which uses the "MICROSOFT POCKETWORD" brand word processor, the file must undergo conversion to a format suited for the "MICROSOFT POCKETWORD" brand processor. This is indicated by block 216. If no conversion is required, processing simply continues at block 224.

However, if conversion is required, provider 154 invokes a conversion engine which makes the necessary conversion and places the converted information in a temporary folder. This is indicated by block 218. The invocation of a converter engine also includes generating and walking an exclusion list based upon converters which do not have registered default import and export keys. This is described in greater detail with respect to FIGS. 13–15.

After the data has been converted, provider 154 obtains the file attribute information 186 and the relative path information 188 and adds that information to the packet being created. This is indicated by blocks 220 and 222.

Next, the file is opened such that the first packet being created can be filled to capacity with file object content 190. This is indicated by blocks 224 and 226. The packet is then returned to synchronization manager 148 for transmission to mobile device 12. The GetPacket function is continually called by synchronization manager 148 until provider 154 returns the value RWRN_LAST_PACKET which indicates that the last packet has been returned.

FIGS. 10A–10C are flow diagrams illustrating the operation of sync engine 36 in performing a set packet operation (i.e., in receiving a packet being synchronized from mobile device 12). Synchronization manager 148 first receives a packet as indicated by block 228. Synchronization manager 148 then calls IReplObjHandler::SetPacket supplying the packet, as indicated by block 230. This supplies the packet to file sync provider 154 which, in turn, determines whether this packet is the first packet of a specified object. This is indicated by block 232. If this packet is not the first packet, provider 154 simply writes the packet to the file which has been opened to receive these packets, and processing continues at block 246. This is indicated by block 234.

However, if this is the first packet of an object to be synchronized, provider 154 opens the packet and checks the internal bits as indicated by block 236 and determines whether this object is a new object (i.e., it is an object which has not previously been synchronized to desktop computer 14). This is indicated by block 238. If provider 154 determines that this is a new object, provider 154 brings up a dialogue to the user indicating that this is a new object and indicating where the object is being stored and backed up. Provider 154 also backs up the object at the same time. This is indicated by block 240.

However, if this is not a new object, processing simply continues at block 242 where provider 154 obtains the attribute information 186 and file path information 188 from the packet. Since this is the first packet in the identified object, provider 154 then creates a file in the temp directory. This is indicated by block 244.

Provider 154 then determines whether there are any additional packets to receive for this object. If so, control continues at block 228 and another packet is received and the function SetPacket is again called by synchronization manager 148. This is indicated by block 246.

However, if there are no more packets to be received for this object, sync provider 154 determines whether synchronization manager 148 is in a conflict situation in which both instances of the same object have been changed. This is indicated by block 248. If so, provider 154 simply returns a dummy handle to synchronization manager 148, which resolves the conflict situation as described with respect to FIG. 7B. This is indicated by block 250.

If, at block 248, provider 154 determines that this is not a conflict situation, provider 154 creates the destination path for the file conversion, and invokes the converter engine to convert the file to the appropriate form for storage on file object store 34. This is indicated by blocks 252 and 254.

At block 252, one of two destination paths are created. If provider 154 is to perform a combine operation (described below), then the destination path is created in the temp directory. Otherwise, the destination path is simply the full pathname in the synchronized files folder in file object store 34.

A combine/discard operation is required if the mapping between the stores on desktop 14 and device 12 have been lost, for some reason. This mapping must be re-established using the combine/discard process. A combine operation means combining all the desktop and device objects together. A discard operation means discarding the device objects and replacing them with desktop objects. Therefore, at block 252, if provider 154 is performing a combine operation, the destination path for the file to be converted is in the temp directory. Otherwise, it is simply in the synchronized files folder.

Provider 154 then takes one of two courses of action, depending on whether it is performing a combine operation, as determined in block 256. If the combine operation is being performed, provider 154 determines whether the file in the temp folder which has just been synchronized from the mobile device is the same as (i.e., identical to) the original file in the synchronized files folder. In order to do this, in accordance with one embodiment, provider 154 simply performs a binary comparison of the two files. If they are the same, and the destination file still exists, provider 154 returns a flag referred to as the RSF_DUPLICATED_OBJECT flag to synchronization manager 148 indicating that the file is a duplicate file, so that it does not need to be processed, as it would otherwise be during the synchronization process.

If, at block 260, it is determined that the destination file does not exist, then provider 154 copies over the file then in the temp directory to the destination folder, as indicated by block 264.

Further, if, at block 258, the binary comparison indicates that the file in the temp folder and the original file are not the same, the original file is renamed to "copy of <file name>" and the file in the temp directory is copied into the original file in the destination folder. This is indicated by blocks 266 and 268.

If, at block 256, it is determined that the present operation is not part of a combine operation, processing simply skips to block 270. At block 270, provider 154 determines whether the object being synchronized already existed on the desktop, but simply had a different file name. This can occur, for instance, when the sequence illustrated by FIG. 10D is performed. For example, if the user creates a file on the desktop named "meeting.doc", as indicated by block 273, and places this file into the synchronized files folder, the next time desktop 14 is connected to device 12, "meeting.doc" will be synchronized to the device. This is indicated by block 275. At the same time, synchronization manager 148 on desktop 14 will create a mapping between the desktop "meeting.doc" file, and the device "meeting.doc" file. This is indicated by block 277. Then, assume that the user renames "meeting.doc" on the device to "summary.doc". This is indicated by block 279. That being the case, the "WINDOWS CE" brand operating system will generate a notification that "meeting.doc" has been deleted. The operating system will also generate a notification indicating that a document "summary.doc" has been created immediately thereafter. This is indicated by block 281.

When the synchronization operation is re-started (such as when the device 12 is reconnected to the desktop 14) it will appear that "meeting.doc" has been deleted from the mobile device 12, which would ordinarily cause the deletion of "meeting.doc" from the desktop 14. This is indicated by blocks 283 and 285. However, this would be inefficient since the file "meeting.doc" has simply been renamed to "summary.doc".

Therefore, referring again to FIG. 10C, at block 270 it is determined whether the object already exists on the desktop, but simply has a different file name. There are a number of different ways that this can be accomplished. For example, since the "WINDOWS CE" brand operating system treats a rename on device 12 as a delete followed by an immediate recreate of a file, synchronization manager 148 can simply monitor the change notifications received from device 12 to look for situations where a delete has been immediately followed by a recreate. In that instance, synchronization manager 148, itself, determines that this is not a deletion and creation of a file and treats it as a normal change. The file sync provider 154 can determine that this is a rename by cracking the packet open and viewing the contents of the object to determine whether it is identical to another object, except for the file name.

In any case, if, at block 270, it is determined that it has not simply been a rename, then the new object handle is created at block 272.

If, however, at block 270, it is determined that this has been simply a rename, provider 154 determines whether the object is a directory. This is indicated by block 274. If it is a directory, the directory is simply renamed at block 276 and provider 154 returns a flag referred to as the RSF_UPDATED_HANDLE flag and also returns the new handle for the renamed directory. This is indicated by blocks 278 and 280.

If, however, at block 274, it is determined that the object is not a directory (meaning that it is a file) the original file is deleted (since it has been renamed). This is indicated by block 282. Again, provider 154 returns the RSF_UPDATED_HANDLE flag and returns the new handle to synchronization manager 148. This is indicated by blocks 282, 278 and 280.

Upon receiving the RSF_UPDATED_HANDLE flag, synchronization manager 148 simply maps the newly created "summary.doc" file to the one on device 12. In other words, the old mapping of the original file is simply updated.

FIGS. 11A and 11B illustrate the operation of device 12 when performing a SetPacket operation. This occurs when the desktop sends a file to the device for writing. Initially, synchronization manager 140 receives a packet and calls the SetPacket function. This is indicated by block 286.

File sync provider 146 then determines whether this is the first packet of the object, as indicated by block 288. If so, provider 146 obtains the relative path and attributes from the packet, as indicated by block 290.

Provider 146 then determines whether the object is a directory. This is indicated by block 292. If the object is not a directory, provider 146 ensures that all appropriate subdirectories in the path are created, as indicated by block 294. Provider 146 then ensures that the file is unlocked as indicated by block 296.

Provider 146 then determines whether the file name containing the object identifier in the packet which has just been received is different from the file name in the file which has just been opened. If so, the file is renamed to that contained in the packet. This is indicated by block 298.

Then, the file is opened for writing, as indicated by block 300, and another packet is received.

If, at block 292, provider 146 determines that the path identifies a directory, provider 146 determines whether the directory already exists, as indicated by block 302. If not, the directory is created and the new object ID is set in the log which is maintained by synchronization manager 140 which is used in creating the lists of objects to be synchronized. This is indicated by blocks 304 and 306. The attributes provided in the packet are then set in the directory and the change bit which was set by the operation system notification is cleared. This is indicated by blocks 308 and 310.

If, at block 288, provider 146 determines that this is not the first packet of the object being synchronized, provider 146 simply writes the packet to the file which has been opened, as indicated by block 312. Provider 146 then determines whether additional packets are to be received as indicated by block 314. If so, additional packets are received and written to the open file. This process continues until all packets in the object being synchronized have been received.

FIG. 12 is a flow diagram illustrating the operation of file sync provider 146 on device 12 in performing a GetPacket operation. This occurs when the desktop requests a file to be sent from the device. First, synchronization manager 140 calls the GetPacket function. This is indicated by block 316. Provider 146 then determines whether the packet being obtained is the first packet in the identified object. This is indicated by block 318. If it is not the first, processing continues at block 328 and provider 146 simply fills the packet to its capacity with file content. Then, provider 146 determines whether any additional packets exist for the object. If so, provider 146 simply waits to receive another GetPacket call from synchronization manger 140. If no additional packets are present, file synchronization provider 146 returns an appropriate value to synchronization manager 140 indicating that.

If, at block 318, provider 146 determines that the packet is indeed the first packet, provider 146 obtains the object identifier for the object and sets an indication that the change bit in the change notification must be cleared once the file has been synchronized to the desktop. This is indicated by blocks 320 and 322. File sync provider 146 then places the relative path and file attributes into the packet, since it is the first packet. This is indicated by block 324.

Next, assuming that the object is a file and is not in a conflicting situation, the file is opened for reading and a remainder of the packet is filled with file content. This is indicated by blocks 326 and 328. This process continues until the entire object has been packetized and sent to synchronization manager 140 for transmission to desktop 12.

CREATING THE EXCLUSION LIST

As discussed above, some files need conversion such that they are in a suitable format for the destination for which they are being synchronized. For example, files which are in a format suitable for the "MICROSOFT WORD" brand word processor which are being synchronized to device 12 must be converted so that they are in a format suitable for the "MICROSOFT POCKETWORD" brand word processor.

If a converter is registered in the operating system of desktop 14, it may have default import and export keys which are used in performing the conversion. An import key is used in performing a conversion for importing the file to mobile device 12. An export key is used in converting the file for exporting it from mobile device 12 to desktop 14.

If the necessary import or export key does not exist, the file cannot be adequately converted. For example, if an import key exists for a document, the file can be converted from the format on desktop 14 to the format on device 12. However, if the corresponding export key does not exist, the file cannot be converted back to the format on desktop 14. Therefore, if the synchronization components attempt to synchronize the file back to the desktop, without converting it, the synchronization component would rewrite the document on desktop 14 with the differently formatted document on device 12, thus possibly losing information in the synchronization back to the desktop. The same is true if the import key does not exist. Therefore, each time device 12 is connected to desktop 14, an exclusion list is created or modified for both the desktop and the device.

FIG. 13 is a flow diagram illustrating the creation of the exclusion lists. First, the device 12 is connected to the desktop 14 as indicated by block 332. The converter engine on desktop 14 then makes a suitable interface call to enumerate all registered converters. This is indicated by block 334. The converter engine then determines whether the particular converter has a registered default import key as indicated by block 336. If so, processing simply continues at block 340, and the converter is not added to the exclusion list on the desktop. However, if no import key exists, the file extension associated with the converter is added to the desktop exclusion list as indicated by block 338.

The converter engine then determines whether any more converters have been registered. This is indicated by block 340. If so, the converter engine again checks for appropriate default import keys and adds the necessary file extensions to the exclusion list. This continues for each registered converter and object type. Once all converters and object types have been examined, the exclusion list is written to the registry on desktop computer 14. This is indicated by block 342.

The same process is performed to generate an exclusion list for mobile device 12. However, in block 336, rather than looking for registered default import keys, the converter engine looks for registered default export keys. If the export keys do not exist, the file extension is added to the exclusion list which is written to the registry in a location associated with the particular device then connected to desktop computer 14.

UTILIZATION OF THE EXCLUSION LISTS

Once the exclusion lists have been created, they are utilized by the converter engines each time the converter engines are invoked. FIG. 14 is a flow diagram indicating how they are utilized. First, synchronization manager 148 makes a call to file sync provider 154 indicating that a selected object needs to be packetized for synchronization. This is indicated by block 344. The provider 154 invokes the converter engine and examines the exclusion list, as indicated by block 346. If the object type to be synchronized does not reside in the exclusion list, as indicated by block 348, the object is simply synchronized to mobile device 12 in the normal fashion. This is indicated by block 350.

If, at block 348, it is determined that the object to be synchronized is contained in the exclusion list, provider 154 returns a value to synchronization manager 140 causing it to simply ignore the change during the present synchronization process. This is indicated by block 352.

It should be noted that the exclusion list is examined each time a file is to be converted for synchronization. Therefore, a file change may be ignored during one synchronization process because the converter is contained in the exclusion list. However, if the necessary converter is later installed on the desktop 14 and added to the registry, the exclusion list will be updated the next time the device 12 is connected to the desktop 14, thus removing the file extension associated with the converter from the exclusion list. Therefore, during the next synchronization process, the object will no longer be ignored, but will be synchronized.

FIG. 15 is a flow diagram illustrating utilization of the exclusion list created for device 12. First, the synchronization components detect that an object needs to be synchronized as discussed above. This is indicated by block 354. The exclusion list is then examined to determine whether the object type (e.g., file extension) is contained in the exclusion list. This is indicated by block 356. If the object type is not contained in the exclusion list, the object is simply synchronized to the desktop device and the change notification on device 12 is cleared. This is indicated by blocks 358 and 360.

However, if, at block 356, it is determined that the object type is contained in the exclusion list, synchronization manager 140 simply ignores the change and does not attempt to synchronize the object. This is indicated by block 362. Of course, as with the exclusion list for desktop 14, the exclusion list for device 12 is also updated each time device 12 is connected to desktop 14. Therefore, the object can be synchronized during a later synchronization process, assuming the appropriate converter has been installed and registered in desktop 14.

Appendix A illustrates one embodiment of code which can be used to create the exclusion list.

SUPPRESION OF UI DURING REMOTE SYNC

As discussed above, it may be desirable to suppress certain user interface and dialogue messages when an object is being synchronized remotely, such as via a modem or wireless link, when the user is not at the desktop 14. When an object is to be synchronized, the object first passes a flag to the desktop 14 indicating that the synchronization process is to be conducted remotely. The present invention takes advantage of this flag to suppress UI.

FIG. 16 is a flow diagram illustrating how the UI is suppressed during a remote sync operation. First, a packet is received as indicated at block 364. Provider 154 then checks the packet to determine whether the remote or continuous sync flags have been set. This is indicated by block 366. Provider 154 also checks the registry on desktop 14, at a specific location, which is used to store a value indicating that progress messages are to be suppressed. This is indicated at block 368. If any of the suppression indicators in blocks 366 or 368 are set, provider 154 sets a flag referred to as the CONVERT_NO_UI flag when calling the converter engine. This is indicated by block 370. This value causes the converter engine to suppress conversion progress dialogue, as indicated by block 372.

The converter engine then executes a QueryInterface on an interface designated ICeFileFilterOptions. This is indicated by block 374. The ICeFileFilteroptions interface exposes methods which can be used to manipulate converting and other filtering functions and is set out in Appendix B.

If the ICeFileFilter Options interface is not present, as indicated by block 376, the conversion continues simply suppressing conversion progress dialogue. However, if at block 376 it is determined that the ICeFileFilterOptions interface is present, then the converter engine calls a method indicated by SetFilterOptions specifying UI which should be suppressed during the present operation. This is indicated by block 378. Thus, during a remote or continuous sync operation, the suitable UI is suppressed.

LOCKED FILES

As discussed above, certain files may be locked when synchronization is attempted. For example, if another user is currently using a word processing document, and the file is to be synchronized, the file will be locked to the synchronization components so that it cannot be written to. FIG. 17 is a flow diagram illustrating how the present invention deals with such locked files.

Once it is determined that the file needs to be synchronized, the file sync provider attempts to open the file to synchronize it. This is indicated by block 380. The provider will then determine that the file is locked as indicated by block 382. In that instance, the provider returns to the synchronization manager an error message indicating that the file is locked. This is indicated by block 384. The synchronization manager 148 then simply discontinues the attempted synchronization and indicates that the file for which synchronization has been attempted, is still out of date. This will continue during subsequent synchronization processes until the file is unlocked and synchronized. This is indicated by block 386.

SYNCHRONIZATION OF NON-RELEVANT FILES

In systems which are configured for continuous sync operations, another problem can arise with respect to non-relevant files, such as files stored in the temp directory, shortcuts, etc. For example, if a particular word processing document is contained in the synchronized files folder on the desktop, and the user is editing that document, the word processor typically creates a temporary file in the temp directory and places it in the same folder. As the document is being edited, the temporary file is changed continuously and thus needs to be synchronized continuously to the device. However, this is highly inefficient and takes up an undesirable amount of bandwidth. Therefore, in accordance with one embodiment of the present invention, such non-relevant files are not synchronized, even if they are contained in the synchronized files folder.

File sync provider 154 examines the extension of the file in the synchronized files folder to determine whether they are non-relevant. For example, files which have an extension ".tmp" are not synchronized. File sync provider 154 simply does not indicate to synchronization manager 148 that these files even exist during the enumeration process. Thus, synchronization manager 148 will not even know that such files exist since they have not been enumerated, and they will not be synchronized.

CONCLUSION

Thus, it can be seen that the present invention provides file synchronization in a way that avoids many problems which are otherwise inherent in file synchronization. For example, the present invention deals with files which have been renamed on the device either by the user, or during conversion, in a highly efficient manner. The present invention also identifies duplicate files during a combine operation, prior to the normal sync operation. This also increases efficiency. Further, the present invention provides a user interface message indicating the location of the files being synchronized, backs those files up, and indicates the location of the backup file, when the file is synchronized for the first time. The present invention also creates an exclusion list which is utilized during conversion such that critical information is not lost because proper converter defaults have not been registered. The present invention also suppresses selected user interface messages under appropriate circumstances, deals with file locking problems, and does not synchronize non-relevant files. One or a combination of these features can be implemented in various embodiments of the present invention, to increase efficiency of file synchronization.

Although the present invention has been described with reference to preferred embodiments, workers skilled in the art will recognize that changes may be made in form and detail without departing from the spirit and scope of the invention.

What is claimed is:

1. A method of synchronizing objects indicative of file data between a first object store associated with a first computing device and a second object store associated with a second computing device, the objects having associated file names, the method comprising:
   maintain a mapping table which maps objects to be synchronized on the first object store with corresponding objects on the second object store;
   determining whether an object to be synchronized has been added to the second object store since a last synchronization process;
   if so, adding a corresponding object to the first object store during a subsequent synchronization process;
   determining whether the object added to the first object store during the subsequent synchronization process already exists on the first object store under a different file name;
   if so, deleting the already existing object from the first object store; and
   updating the mapping table to map the object added to the first object store to the object which was renamed on the second object store.

2. The method of claim 1 wherein maintaining the mapping table comprises maintaining a handle associated with each object on the first object store and mapping the handle to a handle associated with a corresponding object on the second object store.

3. The method of claim 2 wherein updating the mapping table comprises updating the handle associated with the already existing object to indicate that the object has been renamed.

4. The method of claim 3 wherein, when the object added to the second object store is renamed from an original name to a new file name, the second computing device deletes the object under the original file name and subsequently recreates the object under the new file name and provides a notification to the first computing device indicating that the object under the original file name has been deleted and that the object under the new file name has been created.

5. The method of claim 4 wherein the first computing device performs the step of determining whether the object added to the first object store during the subsequent synchronization process already exists on the first object store under a different file name based on the notification from the second computing device.

6. The method of claim 1 wherein the first computing device comprises a desktop computer and the second computing device comprises a mobile device and wherein the step of maintaining a mapping table is performed by the desktop computer.

7. A method of synchronizing an object indicative of file data from a first object store to a second object store, the method comprising:
- determining that the object is to be synchronized;
- preparing packets indicative of the object to be transmitted from the first object store to the second object store;
- determining whether the object to be synchronized is a new object in the second object store;
- if so, displaying a message indicating a file path location where the object is to be placed during synchronization and
- transmitting the object from the first object store to the second object store.

8. The method of claim 7 and further comprising:
- if the object to be synchronized is a new object in the second object store, storing a backup copy of the object.

9. The method of claim 8 and further comprising:
- providing a display indicating the file path location of the backup copy.

10. A method of synchronizing objects indicative of file data, each object being one of a plurality of object types, between a first object store associated with a first computing device and a second object stare associated with a second computing device, the method comprising:
- maintaining a list of available converters for conversion of objects from a first format to a second format, each converter being configured to convert at least one of the object types, wherein the list is maintained based on the object types that the converter is configured to convert;
- determining that a selected object is to be synchronized;
- determining that the selected object is to be converted prior to synchronization;
- examining the list;
- generating an exclusion list including object types for which no converter is available;
- determining whether the selected object is of an object type included in the exclusion list; and
- if not, excluding the selected object from synchronization.

11. The method of claim 10 wherein the first computing device comprises a desktop computer and the second computing device comprises a mobile device connectable to the desktop computer and wherein the steps of examining the list, generating an exclusion list including object types for which no converter is available, and determining whether the selected object is of an object type included in the exclusion list, are performed each time the mobile device is connected to the desktop computer.

12. The method of claim 11 wherein the step of maintaining the list of available converters is performed each time the mobile device is connected to the desktop computer.

13. The method of claim 11 and further comprising:
- performing the steps of examining the list, generating an exclusion list including object types for which no converter is available, and determining whether the selected object is of an object type included in the exclusion list for the desktop computer and for the mobile device to create a desktop exclusion list identifying first object types for which no converter is available to convert objects of the first object type to a format suitable for the desktop computer, and a mobile device exclusion list identifying second object types for which no converter is available to convert objects of the second object type to a format suitable for the mobile device.

14. The method of claim 13 wherein the list of available converters is maintained in a registry of the desktop computer.

15. The method of claim 13 wherein the desktop exclusion list and the mobile device exclusion list are maintained in the registry of the desktop computer.

16. A method of synchronizing objects indicative of file data between a first object store associated with a first computing device and a second object store associated with a second computing device, the first and second computing devices being remotely connectable to one another, the method comprising:
- determining that the first and second computing devices are remotely connected to one another;
- determining that a selected object is to be synchronized; and
- suppressing user interface dialog during synchronization, while allowing other computing operations to take place in the background, based on the determination that the first and second computing devices are remotely connected.

17. The method of claim 16 and further comprising:
- determining that the selected object is to be converted from a first format to a second format prior to synchronization; and
- suppressing conversion progress user interface dialog messages during conversion.

18. The method of claim 17 and further comprising:
- determining whether a FileFilterOptions application programming interface is present on the first computing device; and
- if so, calling a SetFilterOptions method exposed by the FileFilterOptions interface providing a value indicating that the user interface dialog messages are to be suppressed.

19. A method of synchronizing objects indicative of file data between a first object store associated with a first computing device and a second object store associated with a second computing device, one of the first and second computing devices being a mobile device and the other being a non-mobile device, the method comprising:
- providing a synchronization manager on the first computing device which determines that a selected object in the second object store is to be synchronized to a corresponding object in the first object store;
- providing a file synchronization provider;
- indicating to the file synchronization provider that the selected object is to be synchronized;
- determining, with the file synchronization provider, that the corresponding object in the first object store is locked;
- returning an error message from the file synchronization provider to the synchronization manager indicating that the corresponding object in the first object store is locked;
- maintaining, at the synchronization manager, an indication that the selected object is to be synchronized until the corresponding object is unlocked.

20. A method of synchronizing objects indicative of file data between a first object store associated with a first computing device and a second object store associated with a second computing device, the method comprising:
- maintaining a folder of objects on the first and second object stores indicative of files to be synchronized; and
- excluding from the synchronization process objects indicative of temporary files located in the folder.

21. The method of claim 20 wherein the first computing device comprises a desktop computer including a synchronization manager and a file synchronization provider, and further comprising:

provinding the file synchronization provider with an enumeration request from the synchronization manager requesting the file synchronization provider to enumerate objects in the folder in order for the synchronization manager to determine which objects in the folder need to be synchronized to corresponding objects in the second object store.

22. The method of claim 21 wherein excluding from the synchronization process comprises:

failing to enumerate objects indicative of temporary files in response to the enumeration request.

23. A method of synchronizing objects indicative of file data between a first object store associated with a first computing device and a second object store associated with a second computing device, the method comprising:

providing a synchronization manager configured to provide an enumeration request and maintain a mapping between the objects on the first object store and the objects on the second object store;

providing a file synchronization provider configured to maintain a folder of file objects to be synchronized and to enumerate the file objects in response to the enumeration request such that the synchronization manager can determine which file objects need to be synchronized; and when the mapping is lost, recovering the mapping by combining the file objects on the second object store with the file objects on the first object store utilizing the file synchronization provider and enumerating the combined files so the synchronization manager can reestablish the mapping, wherein combining includes determining, with the file synchronization provider, which combined file objects are duplicates and deleting one of the duplicates prior to enumerating the file objects.

24. The method of claim 23 wherein determining, with the file synchronization provider, which combined file objects are duplicates, comprises:

performing a binary compare of the combined file objects.

* * * * *

UNITED STATES PATENT AND TRADEMARK OFFICE
CERTIFICATE OF CORRECTION

PATENT NO. : 6,324,544 B1
DATED : November 27, 2001
INVENTOR(S) : Alam et al.

It is certified that error appears in the above-identified patent and that said Letters Patent is hereby corrected as shown below:

Title page,
Item [75], Inventors, "George Hu, Redmond" should be -- George Hu, Kirkland --

Column 1,
Line 48, "optionally" should be -- Optionally --

Column 5,
Line 39, "24" should be -- 26 --

Column 6,
Line 23, "a" should be -- and --

Column 8,
Line 34, delete "42"

Column 9,
Line 55, "122" should be -- 22 --

Column 10,
Line 37, "34" should be -- 30 --
Line 64, "50" should be -- 150 --
Line 65, "espectively" should be -- respectively --

Column 11,
Line 42, "by" should be -- be --
Line 48, insert -- be -- after "to" and -- the -- after "upon"

Column 12,
Line 52, "14" should be -- 12 --

Column 13,
Line 40, ":" should be -- :: --
Line 59, "by" should be -- be --

Column 16,
Line 45, delete "30"

UNITED STATES PATENT AND TRADEMARK OFFICE
CERTIFICATE OF CORRECTION

PATENT NO. : 6,324,544 B1
DATED : November 27, 2001
INVENTOR(S) : Alam et al.

It is certified that error appears in the above-identified patent and that said Letters Patent is hereby corrected as shown below:

Column 18,
Line 33, "manger" should be -- manager --
Line 52, "12" should be -- 14 --

Column 22,
Line 22, "maintain" should be -- maintaining --

Column 23,
Line 25, "stare" should be -- store --

Insert attacted Appendices A and B.

Signed and Sealed this

Tenth Day of August, 2004

JON W. DUDAS
*Acting Director of the United States Patent and Trademark Office*

APPENDIX A

```
/***************************************************************
*\
    Function:       SetImportSyncExclude()

Description:    Enumeration callback function that adds an extension
to the comma
                    delimited list of extensions in pFilterInfo->pResult
if no Default       .
                    IMPORT convertor exists. (See PF_EnumFilterExtensions
())

Arguments:      TCHAR* szExt - extension string; eg "doc".
                    PF_FilterInfo *pFilterInfo - contains information on
the registry key
                    of the currently opened extension. Also contains the
general purpose
                    member pResult (void*).

Returns:        TRUE - if everything went OK
                    FALSE - if something went wrong. Also stops the enume
ration process.

History:        a-kallan 5/28/98

\***************************************************************
*/

BOOL CALLBACK SetImportSyncExclude( TCHAR *szExt, PF_FILTERINFO *pFilte
rInfo )
{
    if ( !(szExt && pFilterInfo && pFilterInfo->pResult) )
    {
        return FALSE;
    }

DWORD dwType = REG_SZ;
    if ( ERROR_SUCCESS != RegQueryValueEx( pFilterInfo->hKey, c_szDefaul
tImport, NULL, &dwType, NULL, NULL ))
    {
        TCHAR *pString;
        // Add to the exclusion string // Chop off the '.'
        _tcscpy( szExt, szExt+1 );

pString = static_cast<TCHAR*>(pFilterInfo->pResult);

// If this isn't the first string, prepend a comma to the list
        if ( TCHAR('\0') != pString[0] )
        {
            _tcscat( pString, TEXT(",") );
```

```
        }
        _tcscat( pString, szExt );
    } return TRUE;
}

/******************************************************************\

Function:       SetExportSyncExclude()

Description:    Enumeration callback function that adds an extension
to the comma
                    delimited list of extensions in pFilterInfo->pResult
if no Default
                    EXPORT convertor exists. (See PF_EnumFilterExtensions
())

Arguments:      TCHAR* szExt - extension string excluding the period;
eg "doc"
                    PF_FilterInfo *pFilterInfo - contains information on
the registry key
                    of the currently opened extension. Also contains the
general purpose
                    member pResult (void*).

Returns:        TRUE - if everything went OK
                    FALSE - if something went wrong. Also stops the enume
ration process.

History:        a-kallan 5/28/98

\******************************************************************/
BOOL CALLBACK SetExportSyncExclude( TCHAR *szExt, PF_FILTERINFO *pFilte
rInfo )
{
    if ( !(szExt && pFilterInfo && pFilterInfo->pResult) )
    {
        return FALSE;
    }

DWORD dwType = REG_SZ;
    if ( ERROR_SUCCESS != RegQueryValueEx( pFilterInfo->hKey, c_szDefaul
tExport, NULL, &dwType, NULL, NULL ))
    {
        TCHAR *pString;
        // Add to the exclusion string
```

```
        // Chop off the '.'
        _tcscpy( szExt, szExt+1 );

pString = static_cast<TCHAR*>(pFilterInfo->pResult);

// If this isn't the first string, prepend a comma to the list
        if ( TCHAR('\0') != pString[0] )
        {
            _tcscat( pString, TEXT(",") );
        }
        _tcscat( pString, szExt );
    } return TRUE;
}

/*********************************************************************
*\

Function:    SetDeviceSyncExclusion()

Description: Sets the sync. exclusion list on the device side.

Arguments:   DEVICEID did

Returns:     S_OK - if successful
                 E_FAIL - if failed

History:     a-kallan - 6/1/98

\*********************************************************************
*/

HRESULT SetDeviceSyncExclusion( DEVICEID did )
{
    HRESULT   hRes = S_OK;
    HCESVC    hsvcDevice = NULL;
    HCESVC    hsvcSync = NULL;
    TCHAR     szExclusionList[ c_dwMaxExtensionList ];

// Initialise the exclusion list.
    szExclusionList[0] = TCHAR('\0');
    PF_EnumFilterExtensions( did, SetExportSyncExclude, (LPVOID)szExclusionList );

// Make sure we have something in the list
    if ( szExclusionList[0] == TCHAR('\0'))
    {
        // In this case it's not an error - simply have no list to add
        hRes = S_OK;
```

```
        goto Fail;
    }

// Open the desktop side registry
    hRes = CeSvcOpen( CESVC_DEVICEX, (LPTSTR)did, FALSE, &hsvcDevice );
    if ( FAILED( hRes ))
    {
        // Couldn't open the registry
        goto Fail;
    }

// Open the sync services key
    hRes = CeSvcOpenEx( hsvcDevice, (LPTSTR)g_szSyncServicesPath, FALSE,
&hsvcSync );
    if ( FAILED( hRes ))
    {
        // Registry path doesn't exist
        goto Fail;
    }

// Set the sync exclusion list in the desktop registry
    hRes = CeSvcSetString( hsvcSync, g_szExportExclude, szExclusionList
);

Fail:
    CeSvcClose( hsvcDevice );
    CeSvcClose( hsvcSync );

TraceError( "SetDeviceSyncExclusion", hRes );
    return hRes;
}

/******************************************************************
*\

Function:      SetDesktopSyncExclusion()

Description:   Sets the desktop side file sync exclusion list in the re
gistry.

Arguments:     DEVICEID did

Returns:       S_OK - if successful
                   Standard Win32 error code returned from either; CeSvcOpe
n(),
                   CeSvcOpenEx(), or CeSvcSetString() - if failed History:       a-kallan - 6/1/98

\******************************************************************
*/
```

```
HRESULT SetDesktopSyncExclusion( DEVICEID did )
{
    HRESULT   hRes = S_OK;
    HCESVC    hsvcDevice = NULL;
    HCESVC    hsvcSync = NULL;
    TCHAR     szExclusionList[ c_dwMaxExtensionList ];

szExclusionList[0] = TCHAR('\0');
    PF_EnumFilterExtensions( did, SetImportSyncExclude, (LPVOID)szExclus
ionList );

// Make sure we have something in the list
    if ( szExclusionList[0] == TCHAR('\0'))
    {
        // Fail is a misnomer here - if there's no filters to add to the
        // exclusion list return S_OK.
        goto Fail;
    }

// Open the desktop side registry
    hRes = CeSvcOpen( CESVC_DEVICEX, (LPTSTR)did, FALSE, &hsvcDevice );
    if ( FAILED( hRes ))
    {
        // Couldn't open the registry
        goto Fail;
    }

// Open the sync services key
    hRes = CeSvcOpenEx( hsvcDevice, (LPTSTR)g_szSyncServicesPath, FALSE,
 &hsvcSync );
    if ( FAILED( hRes ))
    {
        // Registry path doesn't exist
        goto Fail;
    }

// Set the sync exclusion list in the desktop registry
    hRes = CeSvcSetString( hsvcSync, g_szImportExclude, szExclusionList
);

Fail:
    CeSvcClose( hsvcDevice );
    CeSvcClose( hsvcSync );

TraceError( "SetDesktopSyncExclusion", hRes );
    return hRes;
}
```

APPENDIX B

```
/***************************************************************************
 *                                                                         *
 * replfilt.h -- Pegasus filter procedure declarations, structures,        *
 *               constant definitions and macros                           *
 *                                                                         *
 * Copyright (c) 1995-1996, Microsoft Corp. All rights reserved.           *
 *                                                                         *
 ***************************************************************************/

// {6C5C05E0-97A2-11cf-8011-00A0C90A8F78}
DEFINE_GUID(IID_ICeFileFilterSite,
0x6c5c05e0, 0x97a2, 0x11cf, 0x80, 0x11, 0x0, 0xa0, 0xc9, 0xa, 0x8f, 0x78);
// {6C5C05E1-97A2-11cf-8011-00A0C90A8F78}
DEFINE_GUID(IID_ICeFileFilter,
0x6c5c05e1, 0x97a2, 0x11cf, 0x80, 0x11, 0x0, 0xa0, 0xc9, 0xa, 0x8f, 0x78);
// {6C5C05E2-97A2-11cf-8011-00A0C90A8F78}
DEFINE_GUID(IID_ICeFileFilterOptions,
0x6c5c05e2, 0x97a2, 0x11cf, 0x80, 0x11, 0x0, 0xa0, 0xc9, 0xa, 0x8f, 0x78);

#ifndef _REPLFILT_
define _REPLFILT_ ifdef __cplusplus
extern "C" {
endif /* __cplusplus */ typedef LONG CF_ERROR;

define HRESULT_TO_CFERROR(_hr, _def) \
    (SUCCEEDED(_hr) ? ERROR_SUCCESS : (HRESULT_FACILITY(_hr)==FACILITY_WIN32 ?
HRESULT_CODE(_hr) : (_def)))

//
// ICeFileFilterSite interface provided by Windows CE Services
//
#undef  INTERFACE
define INTERFACE   ICeFileFilterSite DECLARE_INTERFACE_(ICeFileFilterSite, IUnknown)
{
    // *** IUnknown methods ***
    STDMETHOD(QueryInterface) (THIS_ REFIID riid, LPVOID * ppvObj) PURE;
    STDMETHOD_(ULONG, AddRef) (THIS) PURE;
    STDMETHOD_(ULONG, Release) (THIS) PURE;

// *** ICeFileFilterSite methods ***
      STDMETHOD(OpenSourceFile) (THIS_
            int nHowToOpenFile,
            LPVOID *ppObj
      ) PURE;
      STDMETHOD(OpenDestinationFile) (THIS_
            int nHowToOpenFile,
        LPCTSTR pszFullpath,
            LPVOID *ppObj
      ) PURE;
      STDMETHOD(CloseSourceFile) (THIS_
            LPUNKNOWN pObj
```

```
        ) PURE;
        STDMETHOD(CloseDestinationFile) (THIS_
        BOOL bKeepFile,
                LPUNKNOWN pObj
        ) PURE;
        STDMETHOD(ReportProgress) (THIS_
            UINT nPercent
        ) PURE;
        STDMETHOD(ReportLoss) (THIS_
            DWORD dw,
        LPCTSTR psz,
        va_list args
        ) PURE;
};

//
// Structures passed to ICeFileFilter methods
//
typedef struct tagCFF_CONVERTINFO
{
    BOOL bImport;
    HWND hwndParent;
    BOOL bYesToAll;
        ICeFileFilterSite *pffs;
} CFF_CONVERTINFO;

typedef struct tagCFF_DESTINATIONFILE
{
    TCHAR szFullpath[_MAX_PATH];
    TCHAR szPath[_MAX_PATH];
    TCHAR szFilename[_MAX_FNAME];
    TCHAR szExtension[_MAX_EXT];
} CFF_DESTINATIONFILE;

typedef struct tagCFF_SOURCEFILE
{
    TCHAR szFullpath[_MAX_PATH];
    TCHAR szPath[_MAX_PATH];
    TCHAR szFilename[_MAX_FNAME];
    TCHAR szExtension[_MAX_EXT];
    DWORD cbSize;
    FILETIME ftCreated;
    FILETIME ftModified;
} CFF_SOURCEFILE;

//
// ICeFileFilter interface to be implemented by a file filter
//
#undef  INTERFACE
define INTERFACE    ICeFileFilter DECLARE_INTERFACE_(ICeFileFilter, IUnknown)
{
    // *** IUnknown methods ***
    STDMETHOD(QueryInterface) (THIS_ REFIID riid, LPVOID * ppvObj) PURE;
```

```
    STDMETHOD_(ULONG, AddRef) (THIS) PURE;
    STDMETHOD_(ULONG, Release) (THIS) PURE;

// *** ICeFileFilter methods ***
      STDMETHOD(NextConvertFile) (THIS_
         int nConversion,
           CFF_CONVERTINFO* pci,
             CFF_SOURCEFILE* psf,
           CFF_DESTINATIONFILE* pdf,
           volatile BOOL *pbCancel,
         CF_ERROR *perr
      ) PURE;
      STDMETHOD(FilterOptions) (THIS_
          HWND hwndParent
      ) PURE;
    STDMETHOD(FormatMessage) (THIS_
        DWORD   dwFlags,
        DWORD   dwMessageId,
        DWORD   dwLanguageId,
        LPTSTR  lpBuffer,
        DWORD   nSize,
        va_list * Arguments,
        DWORD   *pcb
    ) PURE;
};

/*
 * Flags for how to open files
 */
#define CF_OPENFLAT       0
#define CF_OPENCOMPOUND   1
#define CF_OPENDONT       2
#define CF_OPENASKMEHOW   3

//
// Structures passed to ICeFileFilterOptions methods
//
typedef struct tagCFF_CONVERTOPTIONS
{
    ULONG   cbSize;
    BOOL    bNoModalUI;
} CFF_CONVERTOPTIONS;

//
// ICeFileFilterOptions interface to be implemented by a v2 file filter
//
#undef  INTERFACE
define INTERFACE   ICeFileFilterOptions DECLARE_INTERFACE_(ICeFileFilterOptions, IUnknown)
{
    // *** IUnknown methods ***
    STDMETHOD(QueryInterface) (THIS_ REFIID riid, LPVOID * ppvObj) PURE;
    STDMETHOD_(ULONG, AddRef) (THIS) PURE;
    STDMETHOD_(ULONG, Release) (THIS) PURE;
```

```
    // *** ICeFileFilterOptions methods ***
      STDMETHOD(SetFilterOptions) (THIS_
          CFF_CONVERTOPTIONS* pco
      ) PURE;
};

#ifdef __cplusplus
}
endif  /* __cplusplus */ include <CeFltMap.h>
endif /* !_REPLFILT_ */
```